(12) United States Patent
Oba et al.

(10) Patent No.: US 10,406,911 B2
(45) Date of Patent: Sep. 10, 2019

(54) VEHICLE

(71) Applicant: YAMAHA MOTOR POWER PRODUCTS KABUSHIKI KAISHA, Kakegawa-shi, Shizuoka (JP)

(72) Inventors: Yuya Oba, Shizuoka (JP); Makoto Yoshikawa, Shizuoka (JP); Takeshi Ito, Shizuoka (JP)

(73) Assignee: YAMAHA MOTOR POWER PRODUCTS KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/092,370

(22) PCT Filed: Jun. 23, 2017

(86) PCT No.: PCT/JP2017/023184
§ 371 (c)(1),
(2) Date: Oct. 9, 2018

(87) PCT Pub. No.: WO2018/008432
PCT Pub. Date: Jan. 11, 2018

(65) Prior Publication Data
US 2019/0143808 A1 May 16, 2019

(30) Foreign Application Priority Data

Jul. 8, 2016 (JP) .................................. 2016-136457
May 31, 2017 (JP) .................................. 2017-108116

(51) Int. Cl.
*B60K 13/04* (2006.01)
*F01N 13/20* (2010.01)
(Continued)

(52) U.S. Cl.
CPC ............ *B60K 13/04* (2013.01); *B62D 21/183* (2013.01); *F01N 1/00* (2013.01); *F01N 1/24* (2013.01);
(Continued)

(58) Field of Classification Search
CPC ......... B60K 13/04; B62D 21/183; F01N 1/00; F01N 1/24; F01N 13/20
See application file for complete search history.

(56) References Cited

U.S. PATENT DOCUMENTS

| | | | | |
|---|---|---|---|---|
| 7,409,824 | B2 * | 8/2008 | Inaoka | F01N 13/18 180/218 |
| 9,889,736 | B2 * | 2/2018 | Yamada | B62K 5/01 |
| 2019/0143808 | A1 * | 5/2019 | Oba | F01N 1/24 |

FOREIGN PATENT DOCUMENTS

| | | |
|---|---|---|
| JP | 2005-007995 A | 1/2005 |
| JP | 2015-210897 A | 11/2015 |
| JP | 2016-185749 A | 10/2016 |

OTHER PUBLICATIONS

Official Communication issued in International Patent Application No. PCT/JP2017/023184, dated Jul. 25, 2017.
(Continued)

*Primary Examiner* — Bryan A Evans
(74) *Attorney, Agent, or Firm* — Keating and Bennett, LLP

(57) ABSTRACT

A golf car includes an engine and a shroud that covers a cylinder body. The shroud communicates with a muffler cover, which covers a muffler. A silencer is provided at an outlet of the muffler. An elastic exhaust duct is connected to an exit end portion of the muffler cover. An undercover is located lower than the engine, and defines an underside of an engine room. The undercover includes an opening at a more rearward position than the muffler in a side view. The exhaust duct is routed above the undercover, includes a
(Continued)

rearward end portion at the opening, and is fitted to the opening. Holders hold sound absorbing members on an inner circumferential surface of the exhaust duct.

11 Claims, 29 Drawing Sheets

(51) Int. Cl.
  *F01N 1/00* (2006.01)
  *F01N 1/24* (2006.01)
  *B62D 21/18* (2006.01)
  *B60K 5/00* (2006.01)

(52) U.S. Cl.
  CPC .......... *F01N 13/20* (2013.01); *B60G 2300/07* (2013.01); *B60K 2005/003* (2013.01); *B60Y 2200/23* (2013.01)

(56) References Cited

OTHER PUBLICATIONS

Yamamoto et al., "Vehicle", U.S. Appl. No. 16/092,367, filed Oct. 9, 2018.
Nagai et al., "Vehicle", U.S. Appl. No. 16/092,368, filed Oct. 9, 2018.

* cited by examiner

10

VEHICLE

BACKGROUND OF THE INVENTION

1. Field of the Invention

The present invention relates to vehicles, and more specifically to a vehicle including an engine.

2. Description of the Related Art

JP-A 2005-7995 discloses an example of a conventional technique in this field. JP-A 2005-7995 discloses a small vehicle in which a drive unit is mounted at a rear region of a vehicle body frame via a sub-frame. In the small vehicle, the drive unit is composed of an engine and a transmission connected to the engine via a V-belt type automatic transmission device. A muffler is mounted on the left side of the vehicle and is connected to an engine cylinder via an exhaust pipe. At a lower end portion of the muffler, a generally L-shaped exhaust gas discharge pipe is connected, and the pipe is routed through a hole formed in a sound insulation board mounted on a lower portion of the sub-frame, and is brought to the outside. The exhaust gas passes through the pipe and then is discharged rearward from below the muffler and the sound insulation board. The cylinder is covered with a shroud, which provides a path for a cooling wind. A muffler cover which covers the muffler is connected to the shroud. The muffler cover has an opening in its lower surface, and the opening is located above the hole of the sound insulation board. The cooling wind is introduced from the shroud into the muffler cover, cools the muffler and thereafter is discharged below via the opening of the muffler cover and the hole of the sound insulation board.

In JP-A 2005-7995, the pipe connected to the muffler is relatively short and is exposed to the outside from below the sound insulation board. Therefore, there is a possibility that noise from the muffler is not attenuated so much and the noise comes out of the vehicle as the exhaust gas is discharged from the muffler. Also, since the hole in the sound insulation board is located below the opening which is formed in the lower surface of the muffler cover, there is a possibility that noise such as engine vibration noise is not attenuated so much, resulting in noise leakage via the shroud and the muffler cover, out of the vehicle from the hole in the sound insulation board.

SUMMARY OF THE INVENTION

Preferred embodiments of the present invention provide vehicles that reduce sound leakage out of the vehicles.

According to a preferred embodiment of the present invention, a vehicle includes an engine including a cylinder body; a muffler that receives exhaust gas from the engine; a shroud that covers the cylinder body; a muffler cover that covers the muffler and communicates with the shroud; an undercover provided at a lower position than the engine and including an opening; an exhaust duct connected to an exit end portion of the muffler cover; and an engine room including an underside defined by the undercover and which houses the engine, the muffler, the shroud, the muffler cover, and the exhaust duct. In this vehicle, the opening is located at a more rearward position than the muffler in a side view, and the exhaust duct is routed above the undercover and the exhaust duct includes a rearward end portion positioned at the opening in order to discharge the exhaust gas from below the engine room to the outside.

In a preferred embodiment of the present invention, the exhaust duct is connected to the exit end portion of the muffler cover, and extends rearward above the undercover which is provided at a lower position than the engine, and the exhaust duct includes a rearward end portion positioned at the opening that is located at a more rearward position than the muffler in a side view. Exhaust gas from the muffler passes through the exhaust duct and the opening in the undercover, and then is discharged to the outside from below the engine room. Since the exhaust duct extends rearward so that the rearward end portion of the exhaust duct is located at a more rearward position than the muffler, noise from the muffler is attenuated inside the exhaust duct. Also, since the exhaust duct is connected to the muffler cover, a cooling wind from the muffler cover passes through the exhaust duct and is discharged from the opening, and noise propagating through the muffler cover such as vibration noise of the engine is attenuated inside the exhaust duct. Therefore, it is possible to reduce noise leakage outside the vehicle.

Preferably, the exhaust duct is elastic. In this case, it is possible to absorb vertical movements of the muffler cover with the exhaust duct, and it is therefore possible to position the rearward end portion of the exhaust duct in a stable manner at the opening of the undercover.

Further preferably, the exhaust duct is fitted to the opening. In this case, this structure makes it easy to position and attach the exhaust duct.

Further, preferably, the vehicle includes a silencer provided at an outlet of the muffler. In this case, the silencer makes it possible to further attenuate the noise from the muffler, and thus further reduce noise leakage out of the vehicle.

Preferably, the vehicle further includes a sound absorbing member provided on an inner circumferential surface of the exhaust duct. In this case, the exhaust gas noise emitted from the muffler is attenuated by the sound absorbing member provided on the inner circumferential surface of the exhaust duct, and therefore, it is possible to further reduce noise leakage out of the vehicle.

Further preferably, the vehicle further includes a discharge pipe provided at the outlet of the muffler, and the sound absorbing member is located in the exhaust duct along an extended line of a center axis of the discharge pipe. In this case, the sound absorbing member may be provided only at necessary locations on the inner circumferential surface of the exhaust duct, and therefore it is possible to reduce costs.

Further, preferably, the vehicle further includes a holder that holds the sound absorbing member on the inner circumferential surface of the exhaust duct, and the holder includes a perforated plate. In this case, it is possible to provide the sound absorbing member reliably on the inner circumferential surface of the exhaust duct while maintaining the sound absorbing capabilities of the sound absorbing member.

Preferably, the vehicle further includes an open/close member provided inside the exhaust duct, and the open/close member is able to be opened when the vehicle is traveling and closed when the vehicle is stopped. In this case, when the vehicle is moving, the open/close member opens, thus enabling exhaust gas from the muffler to discharge smoothly to the outside from below the engine room via the exhaust duct and the opening of the undercover. On the other hand, when the vehicle is stopped, the open/close member closes, such that it is possible to further attenuate noises such as noise from the muffler and vibration noise of the engine which propagates through the muffler cover, inside the exhaust duct, and therefore further reduce noise leakage outside the vehicle.

Further preferably, the open/close member is able to be opened by the exhaust gas passing through the exhaust duct.

In this case, there is no need to provide separate elements to open the open/close member yet it is possible to open the open/close member.

Further, preferably, the open/close member is opened to an amount in accordance with an exhaust gas pressure received by the open/close member. In this case, as the exhaust gas pressure (amount of exhaust gas) increases, the amount of opening of the open/close member increases. Therefore, when the engine is running at a slow speed (e.g., not greater than about 2500 rpm), the exhaust gas pressure (amount of exhaust gas) is small and the open/close member is half open, so it is possible to achieve both discharging of the exhaust gas and reducing noise leakage to outside of the vehicle. This structure is particularly effective when the vehicle is traveling at a constant speed.

Preferably, the vehicle further includes a cooling hole provided in the exhaust duct, and the cooling hole penetrates an inner circumferential surface and an outer circumferential surface of the exhaust duct downstream of, but adjacent to, the open/close member in its closed state. In this case, it is possible to cool the open/close member and therefore reduce deterioration of the open/close member due to heat.

According to preferred embodiments of the present invention, it is possible for vehicles to reduce sound leakage therefrom.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a rear perspective view showing the frame, a floor panel, and so on.

FIG. 9 is a plan view showing the frame, the floor panel, and so on.

FIG. 15 is a side view (taken from left) showing the frame, the floor panel, and so on.

DETAILED DESCRIPTION OF THE PREFERRED EMBODIMENTS

Hereinafter, preferred embodiments of the present invention will be described with reference to the drawings. Herein, description will be made in which a preferred embodiment of the present invention is applied to a golf car 10 as an example of a vehicle. It is noted that the terms front and rear, right and left, up and down as used in the following description are determined from the golf car driver's position on a seat 18 of the golf car 10, with the driver facing toward a steering wheel 30.

Figure 1:
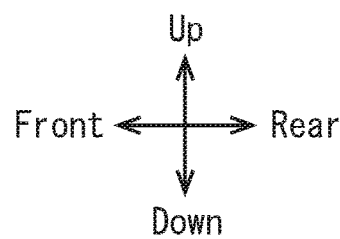
FIG. 1 is a side view (taken from left) showing a golf car according to a preferred embodiment of the present invention.
Figure 1:
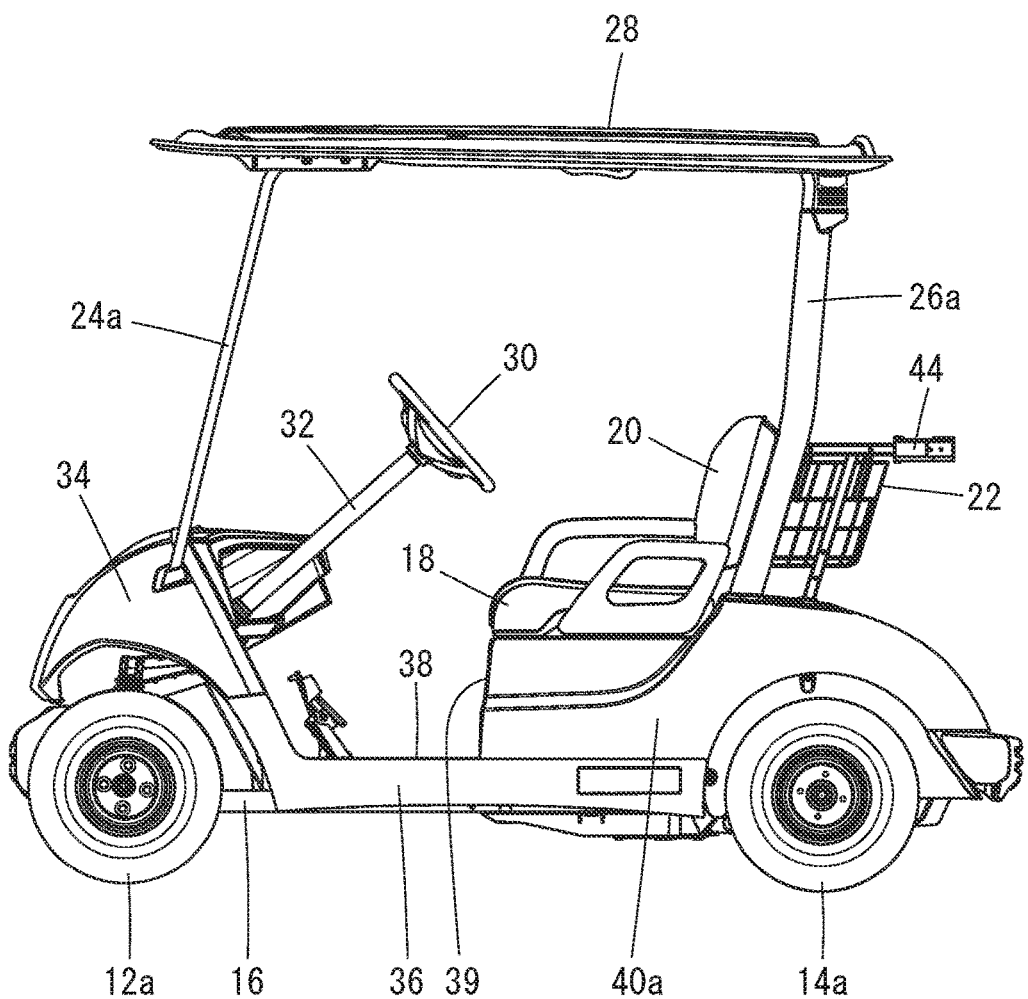
Figure 2:
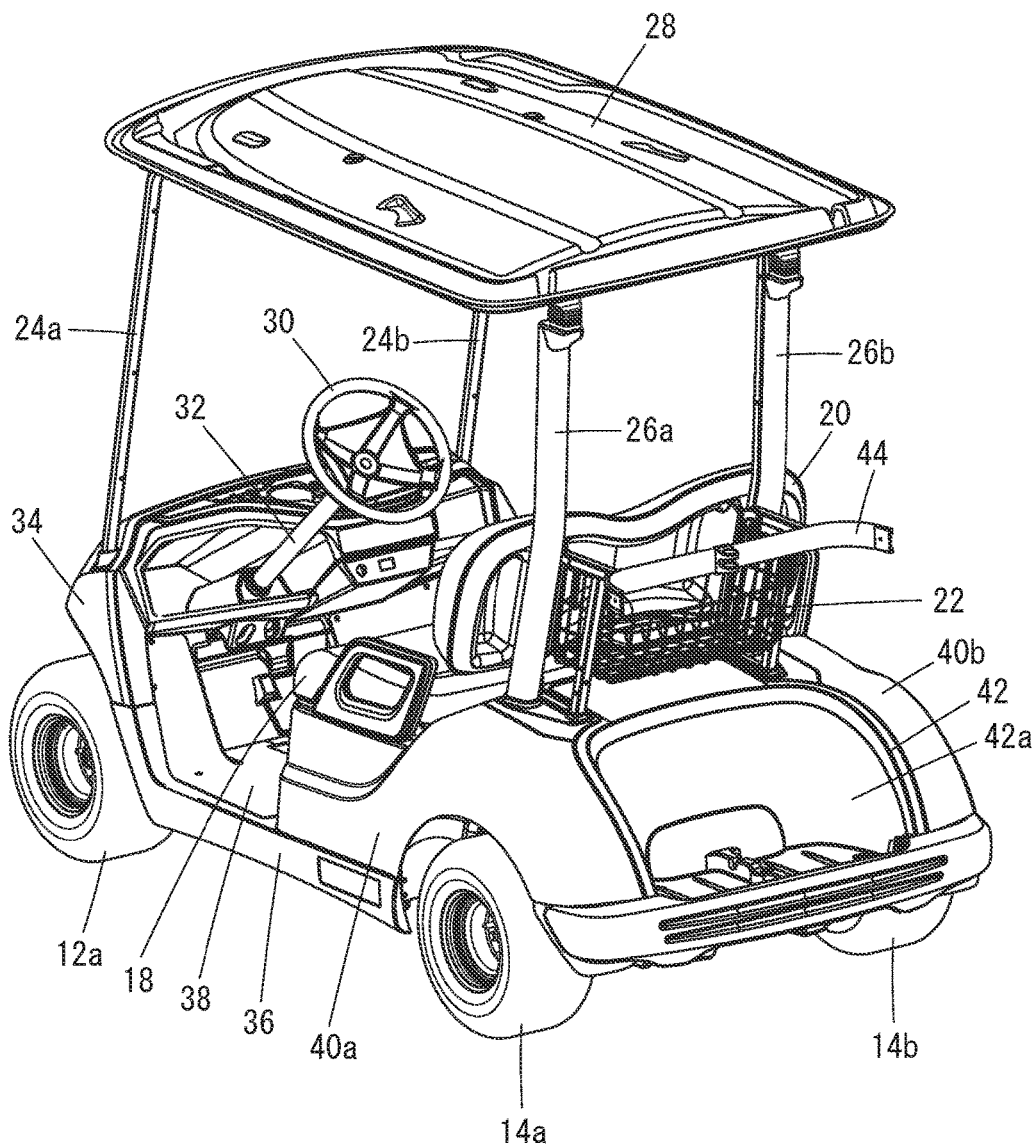
FIG. 2 is a rear perspective view showing the golf car according to a preferred embodiment of the present invention.
Figure 3:
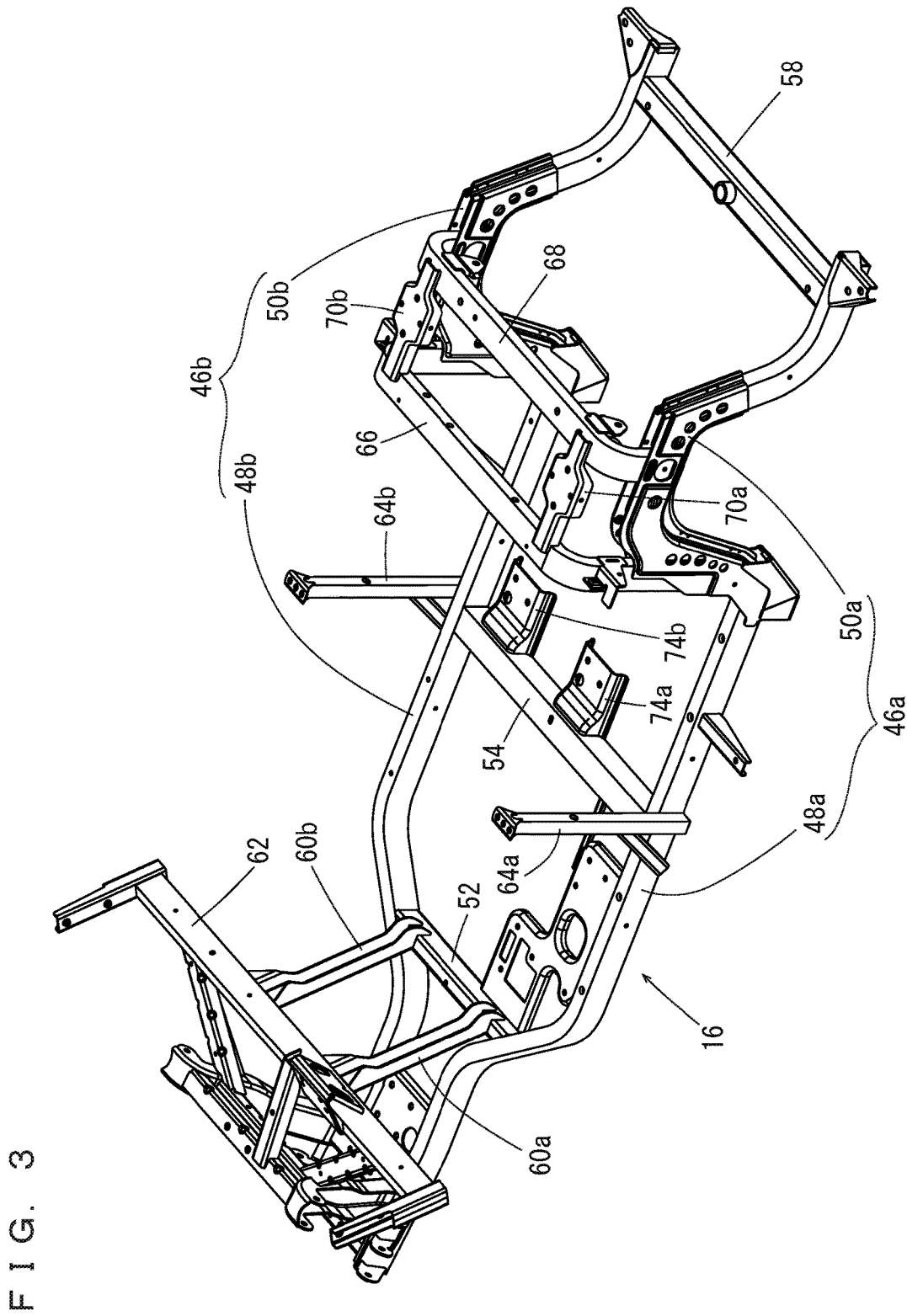
FIG. 3 is a rear perspective view showing a primary portion of a frame.

Referring to FIG. 1 and FIG. 2, the golf car 10 is, for example, a two-person golf car, and includes a pair of front wheels 12a, 12b (see FIG. 9), a pair of rear wheels 14a, 14b, and a frame 16. The pair of rear wheels 14a, 14b are located more rearward than the pair of front wheels 12a, 12b. The pair of front wheels 12a, 12b are supported rotatably at a front region of the frame 16. The pair of rear wheels 14a, 14b are supported rotatably at a rear region of the frame 16.

The seat 18 extends in a width direction of the golf car 10 at a more rearward position than the pair of front wheels 12a, 12b, but at a more forward position than the pair of rear wheels 14a, 14b. The seat 18 is supported by a seat rail 72

(which will be described below) of the frame 16. A seat back 20 is provided at an obliquely upward and rearward position of the seat 18. A basket 22 that accommodates baggage is provided behind the seat back 20. The seat back 20 and the basket 22 are supported by rear pillars 26a, 26b which will be described below.

A pair of front pillars 24a, 24b are provided at more forward positions than the seat 18, whereas a pair of rear pillars 26a, 26b are provided at more rearward positions than the seat 18. The front pillars 24a, 24b and the rear pillars 26a, 26b are supported by the frame 16 at their lower end portions. The front pillars 24a, 24b and the rear pillars 26a, 26b extend from below to above, while tilting slightly rearward. A roof 28 covers from above the seat 18, and is supported by the front pillars 24a, 24b and the rear pillars 26a, 26b.

A steering wheel 30 is located ahead of the seat back 20. The steering wheel 30 is connected to the front wheels 12a, 12b via a steering shaft 32 and an unillustrated connection mechanism.

The frame 16 is covered with a cowl 34, a pair of side protectors 36, a floor panel 38, a body panel 39, a pair of rear fender covers 40a, 40b, and a rear floor cover 42, each made of a resin, for example. The cowl 34 covers the front region of the frame 16 and above the front wheels 12a, 12b. The pair of side protectors 36 cover an intermediate region of the frame 16 from two sides. The floor panel 38, which defines and functions as a footrest for the driver and the passenger sitting on the seat 18 to rest their feet, provides a bottom portion of a cabin space of the golf car 10. The body panel 39 covers a front region below the seat 18. The pair of rear fender covers 40a, 40b cover two sides below the seat 18 and above the pair of rear wheels 14a, 14b. The rear floor cover 42 is sandwiched by rear end portions of the pair of rear fender covers 40a, 40b, and includes a concave portion 42a to place golf bags, for example. By removing the rear floor cover 42 only, it is possible to easily maintain a CVT (Continuously Variable Transmission) 144 (which will be described below) and a transmission 146 (which will be described below). At a position above the concave portion 42a and behind the basket 22, there is provided a holder 44 that holds the golf bags. The holder 44 is supported by connectors 70a, 70b (which will be described below).

Next, a structure of the frame 16 and its surroundings will be described.

Referring to FIG. 3 through FIG. 7, the frame 16 includes a pair of main frames 46a, 46b which are spaced apart from each other in a width direction of the vehicle and extend in a fore-aft direction of the vehicle; cross members 52, 54, 56, 58, and a pair of support frames 60a, 60b. The pair of main frames 46a, 46b respectively include front frames 48a, 48b extending in the fore-aft direction; and rear frames 50a, 50b extending rearward from rear end portions of the respective front frames 48a, 48b. The pair of front frames 48a, 48b are provided so that their front end portions are closer to each other than their rear end portions do. The pair of rear frames 50a, 50b are curved to project upward.

The front frames 48a, 48b are connected to each other by the cross members 52, 54. A portion where the front frame 48a and the rear frame 50a are joined to each other and a portion where the front frame 48b and the rear frame 50b are joined to each other are connected to each other by the cross member 56. The rear frames 50a, 50b have their rear end portions connected to each other by the cross member 58. In other words, the main frames 46a, 46b are connected to each other by the cross members 52, 54, 56, 58 which extend in the vehicle width direction. The cross members 52, 54, 56, 58 are spaced apart from each other in the vehicle fore-aft direction, and are disposed in this order from a front to a rear of the vehicle. The cross member 52 is joined to the pair of support frames 60a, 60b which extend obliquely forward.

The pair of support frames 60a, 60b have their front end portions support a cross member 62 which extends in the vehicle width direction. Near the cross member 54 in the pair of front frames 48a, 48b, a pair of support frames 64a, 64b which extend upward are joined. Also, the pair of rear frames 50a, 50b have their front portions connected to each other by a connection frame 66. The pair of rear frames 50a, 50b have their intermediate regions connected to each other by a connection frame 68. The connection frame 66 extends in the vehicle width direction, with its two end portions extending downward to define an upwardly projecting U-shape. The connection frame 68 extends in the vehicle width direction, with its two end portions extending downward to define an upwardly projecting U-shape. The connection frames 66 and 68 are spaced apart from each other in the vehicle fore-aft direction, and are connected to each other by the connectors 70a, 70b. Further, the pair of support frames 64a, 64b include their upper end portions; the connection frame 66 include two side portions; and these portions are connected to each other by the seat rail 72. The seat rail 72 is C-shaped or substantially C-shaped and extends in a horizontal direction. To the cross member 54, a pair of brackets 74a, 74b are attached side by side in the vehicle width direction.

Figure 4:
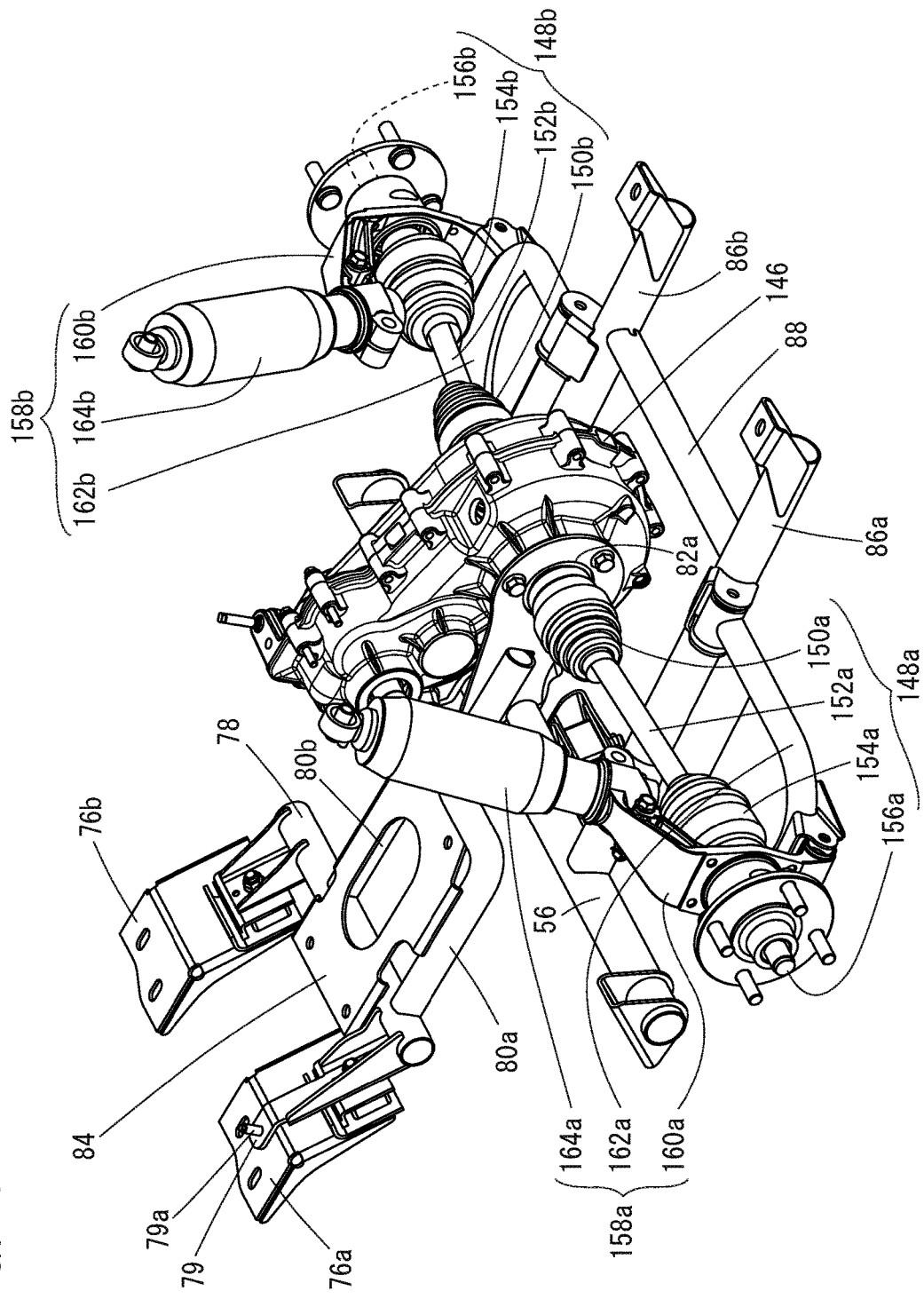
FIG. 4 is a rear perspective view showing a portion of the frame, a transmission, and their surroundings.
Figure 5:
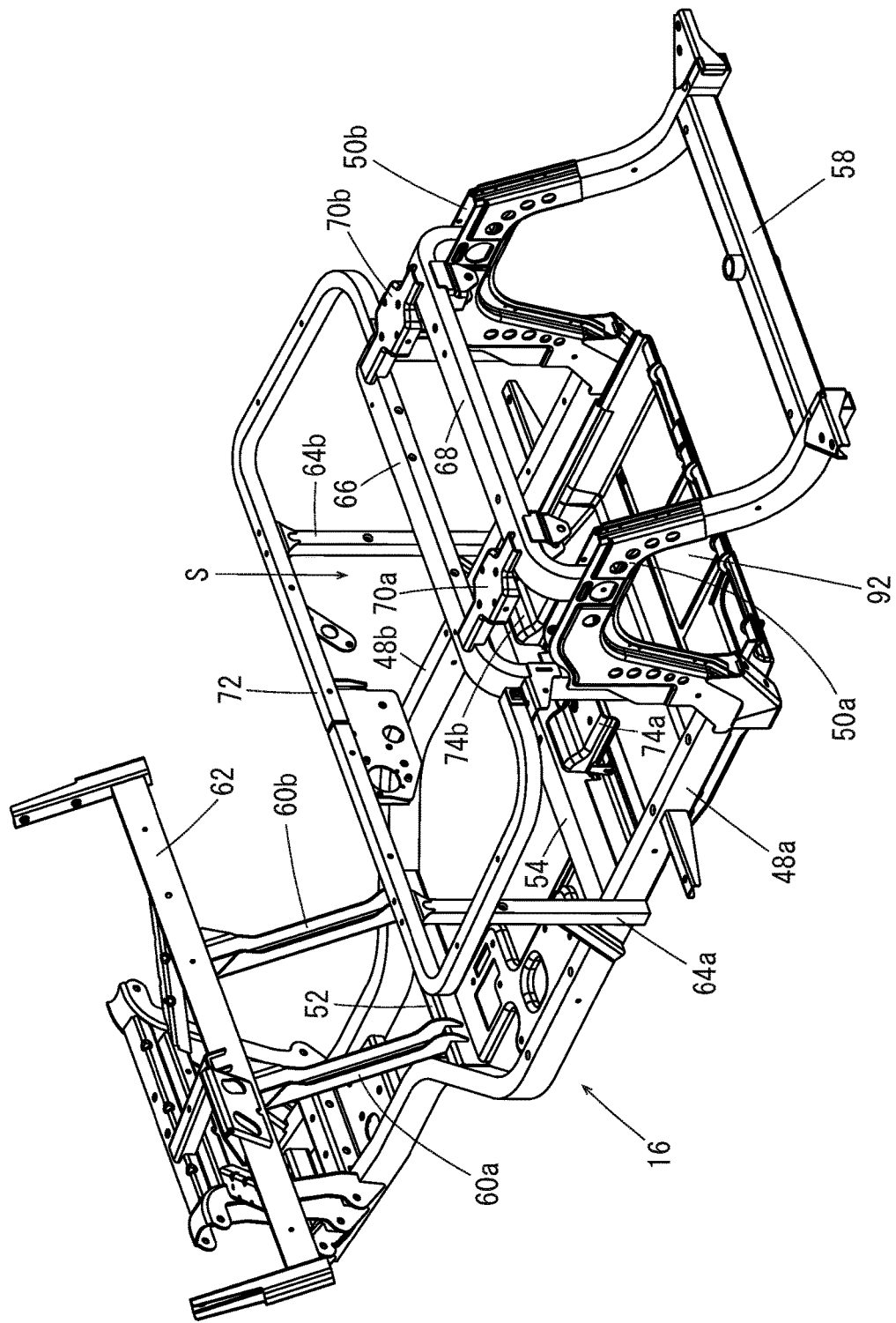
FIG. 5 is a rear perspective view showing a primary portion of the frame and a front cover.

Referring to FIG. 4, a pair of engine brackets 76a, 76b are joined to the pair of brackets 74a, 74b. The engine brackets 76a, 76b are connected to each other via a cross member 78. The cross member 78 is joined to a support frame 79 which extends forward and support frames 80a, 80b which extend rearward. The support frame 79 includes a tip portion including a projection 79a. The support frames 80a, 80b have their respective rear end portions provided with through-holes 82a, 82b (see FIG. 8). On the cross member 78 and the support frames 80a, 80b, there is attached an engine bracket 84 to support an engine 114 (which will be described below). The cross member 78 is pivotably joined to the engine brackets 76a, 76b in an up-down direction. Accordingly, the engine bracket 84 is also pivotable in the up-down direction. The cross member 56 is joined to a pair of frames 86a, 86b which extend rearward. The pair of frames 86a, 86b are connected to each other at regions near their rear end portions by a cross member 88. The pair of frames 86a, 86b have their rear end portions joined to the cross member 58.

Figure 6:
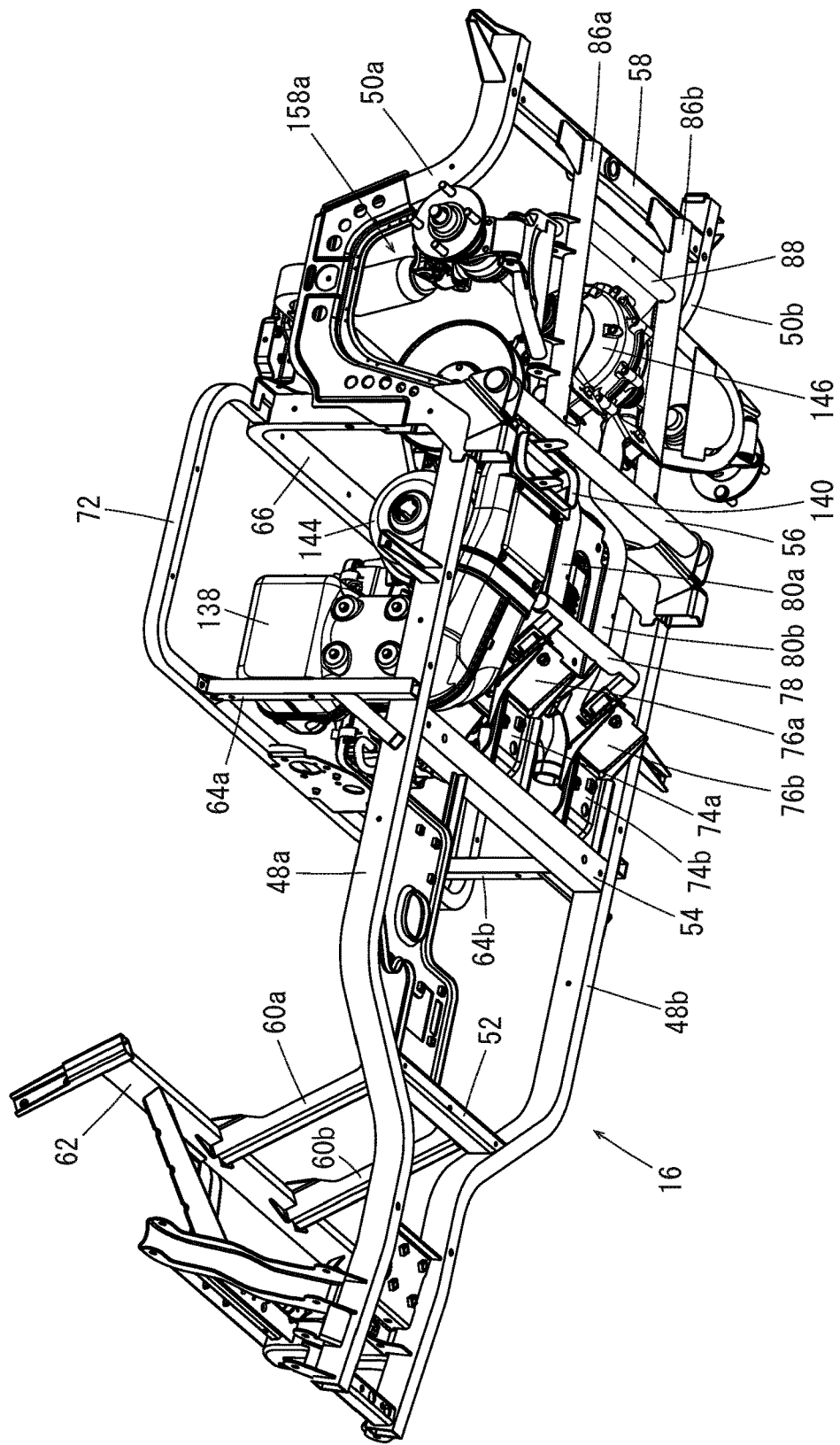
FIG. 6 is a perspective view showing the frame and its surroundings.
Figure 7:
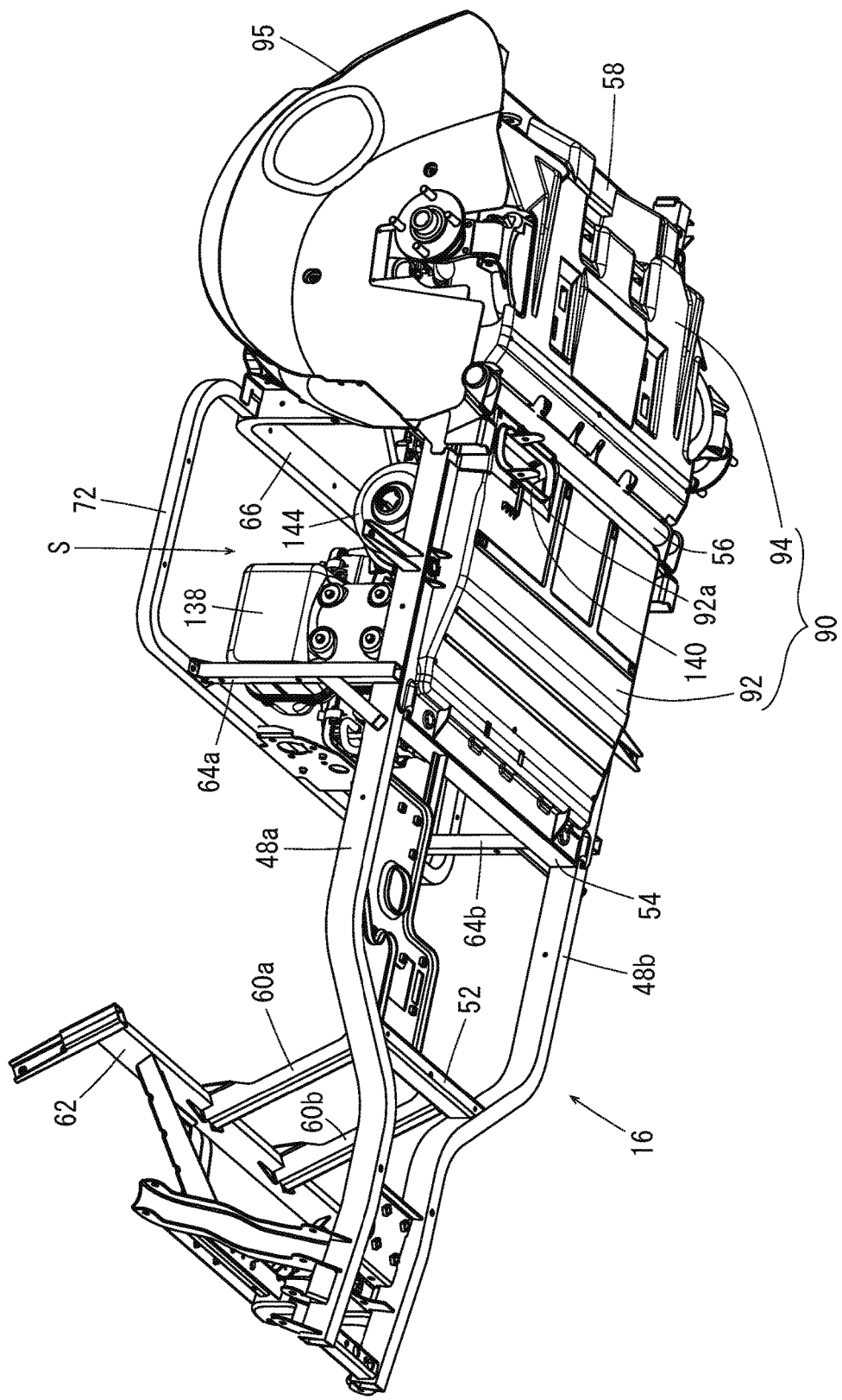
FIG. 7 is a perspective view showing the frame, an undercover, and their surroundings.

Referring to FIG. 6 and FIG. 7, the frame 16 supports an undercover 90. The undercover 90 includes a front cover 92 and a rear cover 94 respectively on its forward and rearward sides. The front cover 92 is located between the cross members 54 and 56, and is attached to the pair of front frames 48a and 48b, and to the cross members 54 and 56. The rear cover 94 is located between the cross members 56 and 58, and is attached to the cross members 56 and 88, the frames 86a, 86b, and the rear frames 50a, 50b. To the rear frames 50a, 50b, a pair of inner cowls 95 (the inner cowl on the right side is not shown) are attached respectively. The pair of inner cowls 95 are located between the rear wheels 14a, 14b and the rear fender covers 40a, 40b to cover above the respective rear wheels 14a, 14b.

The undercover 90, the seat 18, the body panel 39, a heat insulation board 176 (which will be described below), a fuel tank 168 (which will be described below), the left and the right inner cowls 95, and the rear floor cover 42 define a space as an engine room S. In other words, the engine room S is surrounded by the undercover 90, the seat 18, the body panel 39, the heat insulation board 176, the fuel tank 168, the left and the right inner cowls 95, and the rear floor cover 42. In other words, on an under side, an upper side, a front side, a left side, a right side, and a rear side of the engine room S, there are provided the undercover 90, the seat 18, the body panel 39, the heat insulation board 176 and the left inner cowl 95, the fuel tank 168 and the right inner cowl 95, and the rear floor cover 42 respectively. The undercover 90 is provided at a lower location than the engine 114, and defines an under side of the engine room S. As described above, the engine room S is surrounded with the undercover 90, the seat 18, the body panel 39, the heat insulation board 176, the fuel tank 168, the left and the right inner cowls 95 and the rear floor cover 42, such that it is possible to reduce leakage of noise of the engine room S to outside of the engine room S.

Figure 8:
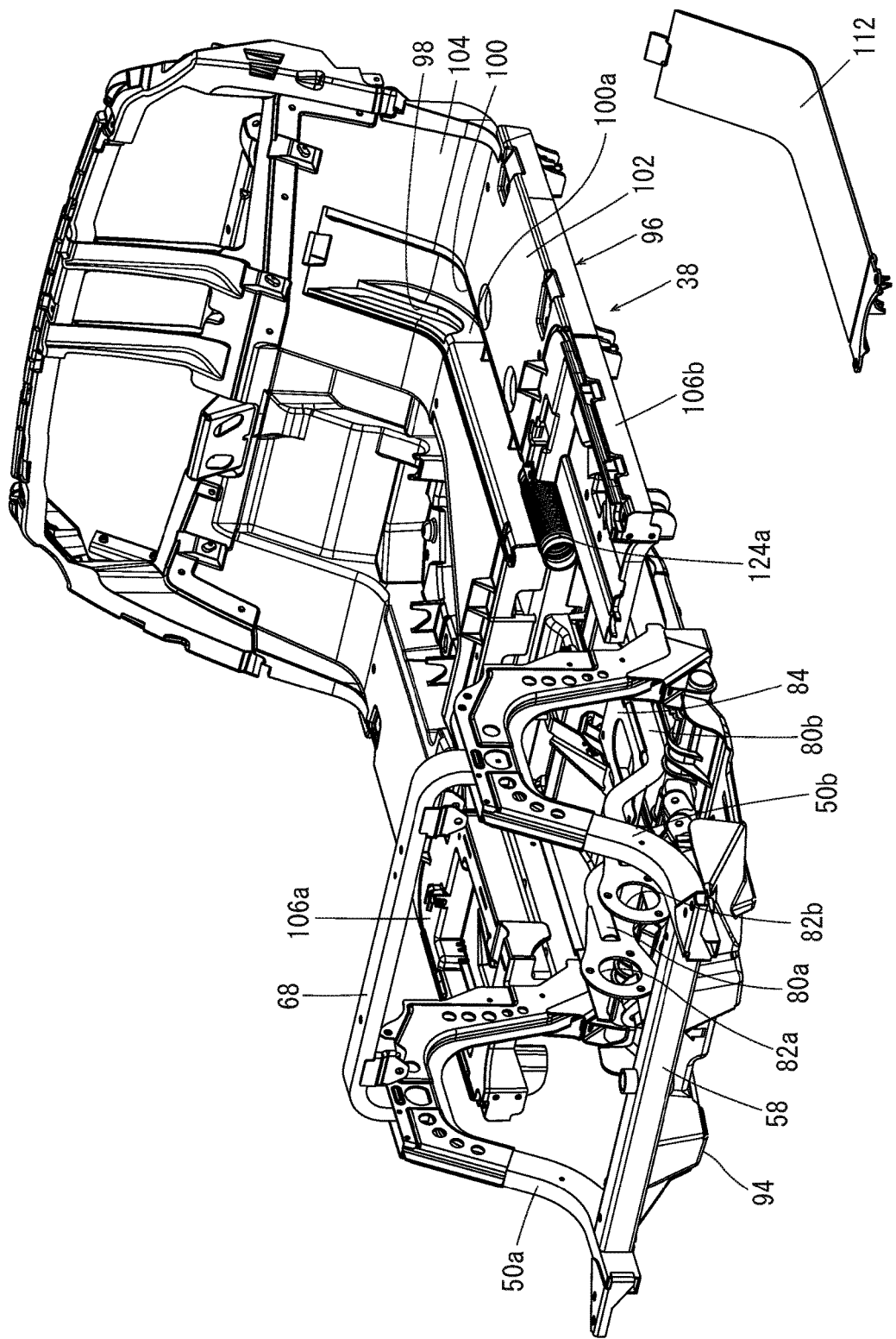
Figure 9:
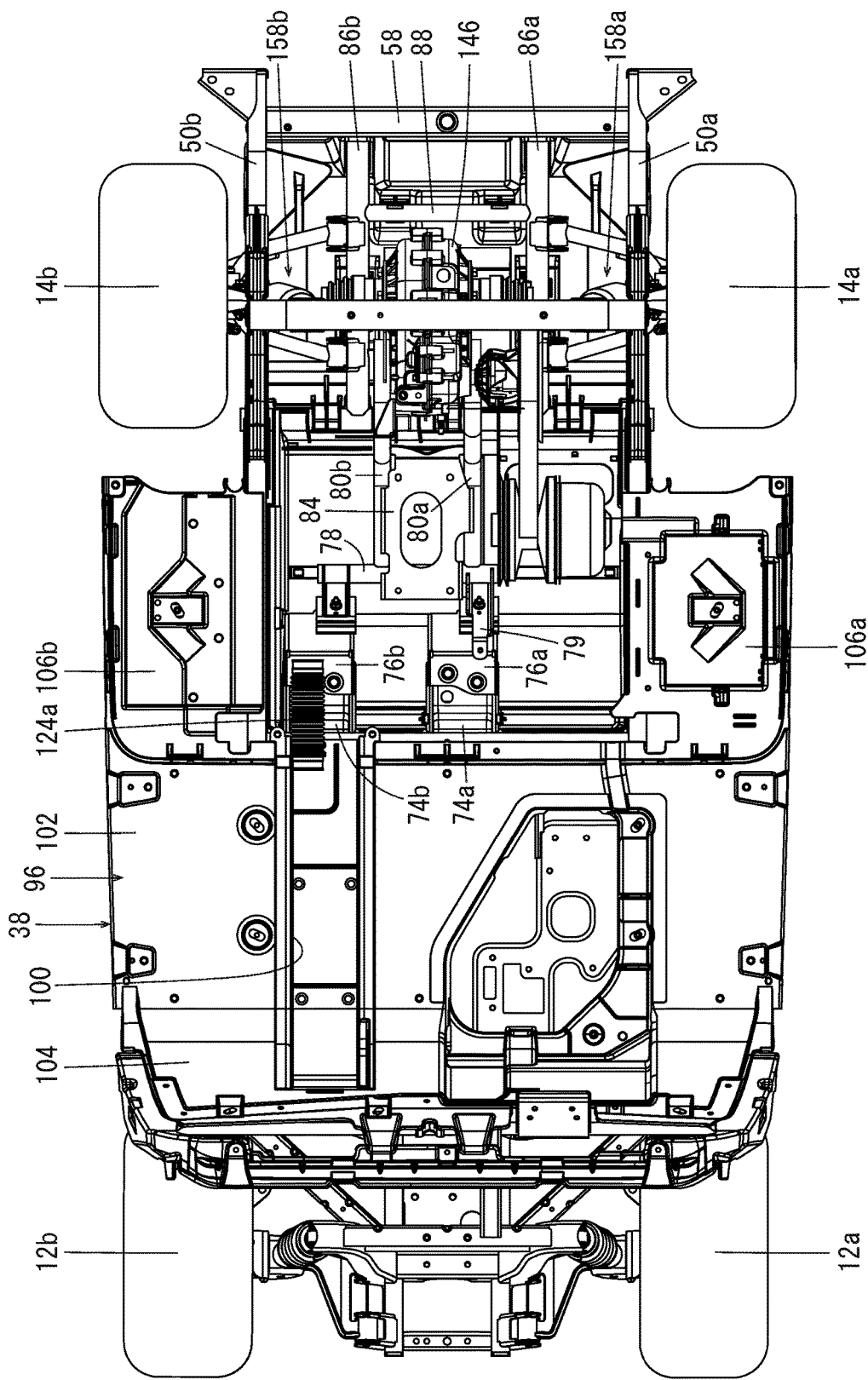
Figure 10A:
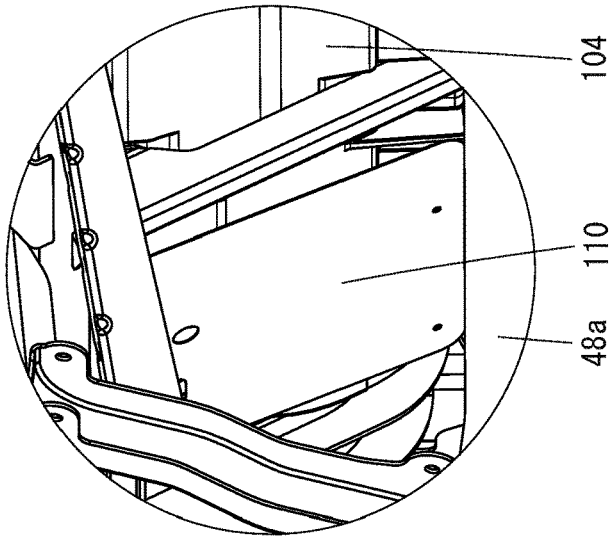
FIG. 10A is an enlarged view showing an opening.
Figure 10B:
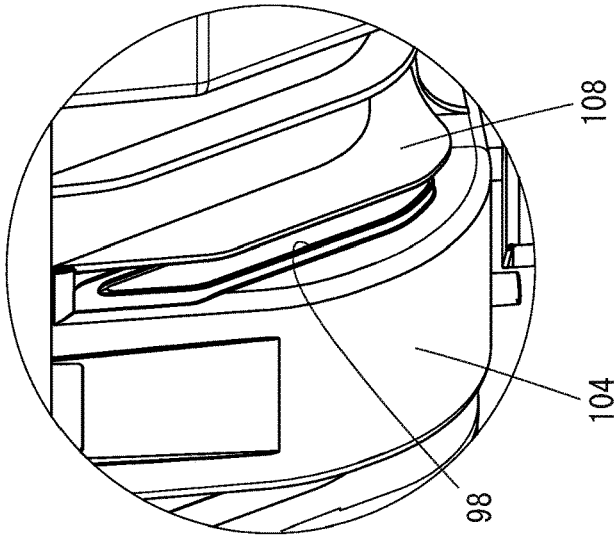
FIG. 10B is an enlarged view showing a plate-shaped member.
Figure 10C:
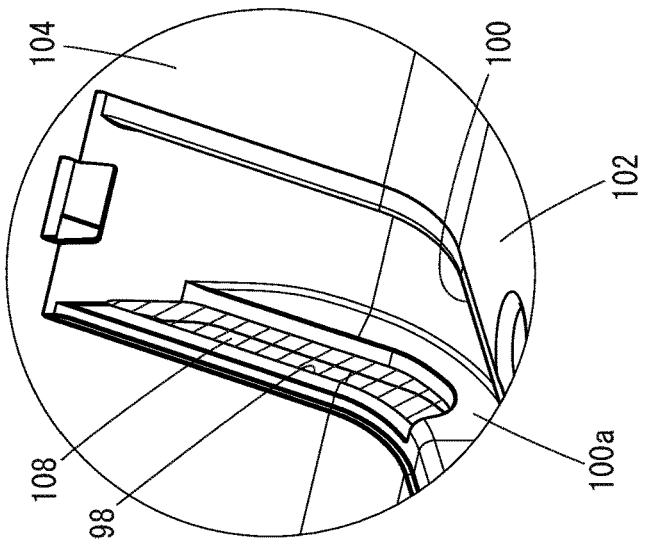
FIG. 10C is an enlarged view showing a cover.
Figure 11:
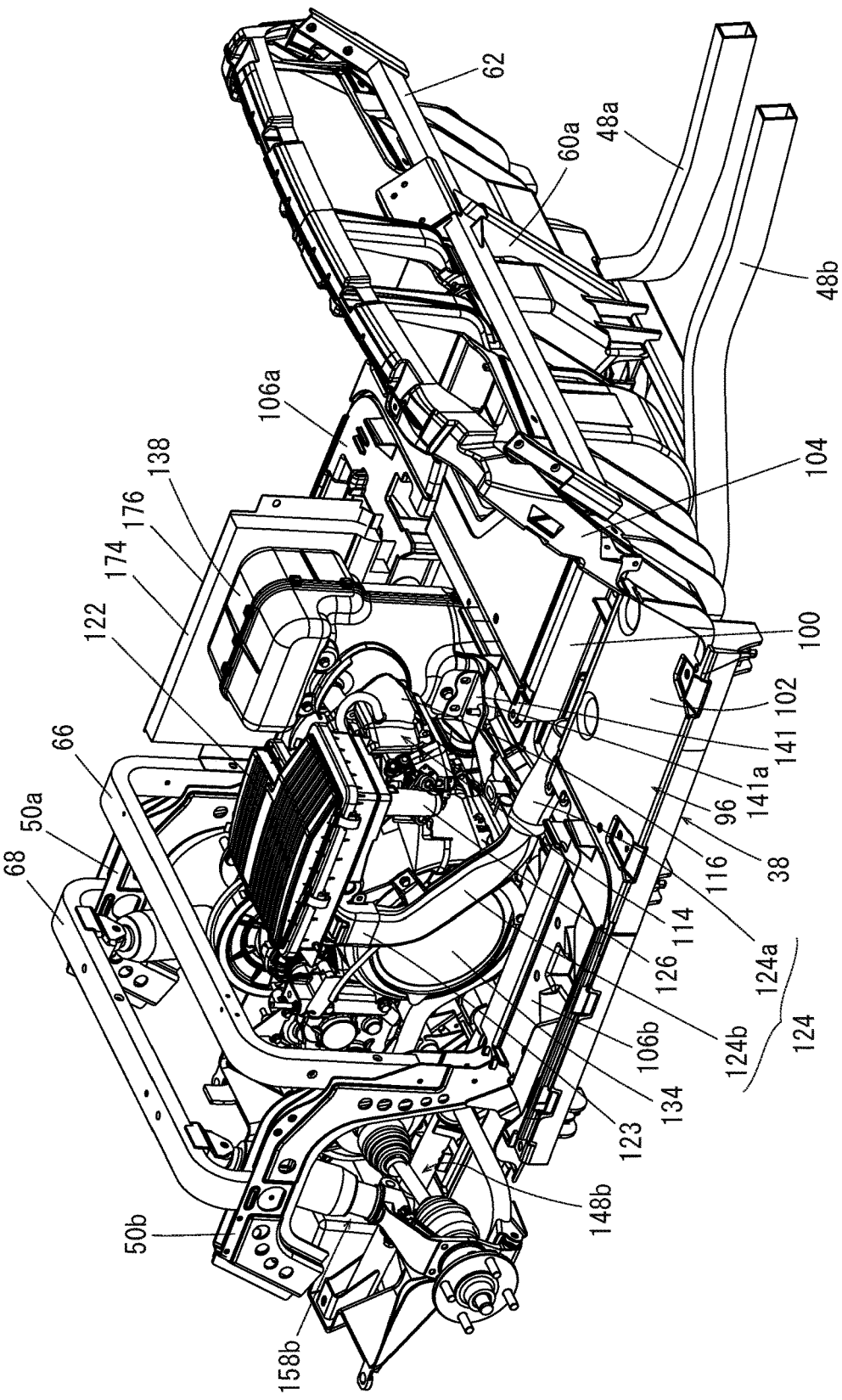
FIG. 11 is a front perspective view showing a primary portion of the golf car.

Referring to FIG. 8 and FIG. 9, the floor panel 38 is provided on the front frames 48a, 48b and the cross member 62 of the frame 16. The floor panel 38 is located between the pair of front wheels 12a, 12b and the pair of rear wheels 14a, 14b. The floor panel 38 includes a panel main body 96, an opening 98, and a groove 100. The panel main body 96 includes a first panel 102 extending horizontally or substantially horizontally in the fore-aft direction between the front wheels 12a, 12b and the rear wheels 14a, 14b; a second panel 104 located behind the front wheels 12a, 12b and extending upward from a front end region of the first panel 102; and third panels 106a, 106b extending rearward from left and right rear end regions of the first panel 102. The first panel 102 is located ahead of the engine room S; the third panel 106a is located on the left side of the engine room S; and the third panel 106b is located on the right side of the engine room S. Preferably, the second panel 104 rises obliquely forward from the front end region of the first panel 102. The opening 98 is located at a front region of the panel main body 96, i.e., in the second panel 104 (see FIG. 10A). FIG. 10B shows the opening 98 with hatching. The groove 100 communicates with the opening 98 in order to supply external air which is introduced from the opening 98 into a shroud 132 (which will be described below) and into the engine 114, is located on an upper surface of the panel main body 96, and extends in a fore-aft direction of the panel main body 96. The groove 100 is continuous from the second panel 104 to the first panel 102, provides communication between the opening 98 and the engine room S, and is able to introduce a running wind from ahead of the golf car 10 to the engine room S. In the present preferred embodiment, the groove 100 is located slightly to the right of the center in the vehicle width direction. The opening 98 is located in a side surface 100a of the groove 100. Referring to FIGS. 10A and 10B, a plate-shaped member 108, which protrudes forward from a reverse surface (front surface) of the second panel 104, is provided on a side of the opening 98. Also, referring to FIG. 10C, a rectangular plate-shaped cover 110, which is supported by the frame 16, is provided ahead of the opening 98. Further, the groove 100 is covered by a lid 112 (see FIG. 8). The lid 112 is defined by a strip-shaped and plate-shaped member having a longitudinal shape of the groove 100.

Referring to FIG. 11 through FIG. 17, inside the engine room S, the engine bracket 84 supports the engine 114. The engine 114 is preferably an air-cooled engine including a single cylinder, for example. The engine 114 includes a fuel injector 115 which injects fuel into an air intake tube 126. The engine 114 is located behind the first panel 102 of the floor panel 38, and includes a cylinder head 116, a cylinder body 118, and a crank case 120. The engine 114 is preferably tilted forward. An air cleaner 122 is provided above the engine 114. The air cleaner 122 is joined to an air intake duct 124 via a joint 123. The air intake duct 124 is located on the right side of the air cleaner 122, and includes a cylindrical front duct 124a and a noise-reducing rear duct 124b having a flattened shape. A rear end portion of the front duct 124a and a front end portion of the rear duct 124b are joined to each other. In order to introduce the external air from the groove 100, the front duct 124a faces the groove 100 from the engine room S, and a rear end portion of the rear duct 124b is joined to the joint 123. Thus, the air intake duct 124 and the air cleaner 122 communicate with each other. As indicated by Arrow X in FIG. 16, the external air, which is introduced from ahead and comes through the opening 98 and into the groove 100, is then introduced into the air cleaner 122 from the groove 100 via the air intake duct 124. Then, after being cleaned by the air cleaner 122, the air is supplied, via the air intake tube 126, into the engine 114. As described above, the air cleaner 122 is provided between the air intake duct 124 and the engine 114. Inside the engine room S, a muffler 128 is provided adjacent to a side (on the left side in the present preferred embodiment) of the engine 114. The engine 114 and the muffler 128 are joined to each other via an exhaust pipe 130. Exhaust gas from the engine 114 is supplied to the muffler 128 via the exhaust pipe 130.

The cylinder body 118 of the engine 114 is covered by the shroud 132, with an air-flowable gap between the cylinder body 118 and the shroud 132. A fan case 134 is provided on a side surface (on the right side surface in the present preferred embodiment) of the engine 114. The shroud 132 and the fan case 134 are connected to each other. Inside the fan case 134, there is provided a fan 136 to supply the external air from the groove 100 into the shroud 132 (between the shroud 132 and the engine 114). The fan 136 is preferably connected to a crank shaft 142 (see FIG. 18) and driven thereby. Also, the muffler 128 is covered by a muffler cover 138 so that an air-flowable gap is provided between the muffler 128 and the muffler cover 138. The shroud 132 and the muffler cover 138 communicate with each other via a duct 139 which covers the exhaust pipe 130. It should be noted here that FIG. 11, FIG. 12, FIG. 20, and FIG. 21 do not show the duct 139. An exhaust duct 140 is connected to an exit end portion of the muffler cover 138. The exhaust duct 140 includes a rear end portion exposed to the outside from an opening 92a of the front cover 92 (see FIG. 7, FIG. 20 and FIG. 22). The muffler cover 138 is supported by the support frame 79 (see FIG. 4 and FIG. 11), as the projection 79a of the support frame 79 is inserted through a hole 141a of a bracket 141 attached on a side surface of the muffler cover 138. As indicated by Arrow Y in FIG. 17 and FIG. 18, the external air which is introduced into the shroud 132 by the fan 136 flows between the shroud 132 and the engine 114 (the cylinder body 118), into the muffler cover 138 (between the muffler cover 138 and the muffler 128), and defines a cooling wind to cool the engine 114 and the muffler 128. Then, the air inside the muffler cover 138 flows through the exhaust duct 140 and is discharged from the opening 92a of the front cover 92, to the outside, below the engine room S. The muffler 128, the muffler cover 138, the exhaust duct 140 and their surroundings will be described below.

Referring also to FIG. 18 through FIG. 21, an output from the crank shaft 142 of the engine 114 is transmitted via the CVT (Continuously Variable Transmission) 144 to the transmission 146. The CVT 144 is located behind the muffler 128, whereas the transmission 146 is located behind the engine 114 between the pair of rear wheels 14a, 14b.

The engine 114, the muffler 128, the shroud 132, the muffler cover 138, the exhaust duct 140, the CVT 144, and the transmission 146 described above are housed in the engine room S.

Referring also to FIG. 4, the transmission 146 is joined to a pair of rotation transmission portions 148a, 148b. The rotation transmission portion 148a extends to the left of the transmission 146, and includes a constant-velocity joint 150a, a drive shaft 152a, a constant-velocity joint 154a, and an axle 156a. The transmission 146 includes an output shaft (not illustrated) connected to the drive shaft 152a by the constant-velocity joint 150a, whereas the drive shaft 152a and the axle 156a are connected to each other by the constant-velocity joint 154a. The rotation transmission portion 148b extends to the right of the transmission 146, and includes a constant-velocity joint 150b, a drive shaft 152b, a constant-velocity joint 154b, and an axle 156b. The transmission 146 includes an output shaft connected to the drive shaft 152b by the constant-velocity joint 150b, whereas the drive shaft 152b and the axle 156b are connected to each other by the constant-velocity joint 154b. The axle 156a supports the rear wheel 14a, whereas the axle 156b supports the rear wheel 14b. It should be noted here that the through-hole 82a at the rear end portion of the support frame 80a is penetrated by the output shaft of the transmission 146 between the transmission 146 and the constant-velocity joint 150a, whereas the through-hole 82b at the rear end portion of the support frame 80b is penetrated by the output shaft of the transmission 146 between the transmission 146 and the constant-velocity joint 150b (see FIG. 13).

Also, the pair of rear wheels 14a, 14b are suspended by a pair of suspensions 158a, 158b. In the present preferred embodiment, the pair of suspensions 158a, 158b are preferably independent suspension systems. The pair of suspensions 158a, 158b include knuckles 160a, 160b, arms 162a, 162b, and shock absorbers 164a, 164b respectively. The knuckle 160a rotatably supports the axle 156a. The arm 162a connects a lower portion of the knuckle 160a and the frame 86a to each other. The shock absorber 164a includes a lower end portion and an upper end portion, respectively, joined to an upper end portion of the knuckle 160a and to the connection frame 68. Likewise, the knuckle 160b rotatably supports the axle 156b. The arm 162b connects a lower portion of the knuckle 160b and the frame 86b to each other. The shock absorber 164b includes a lower end portion and an upper end portion, respectively joined to an upper end portion of the knuckle 160b and to the connection frame 68.

Figure 12:
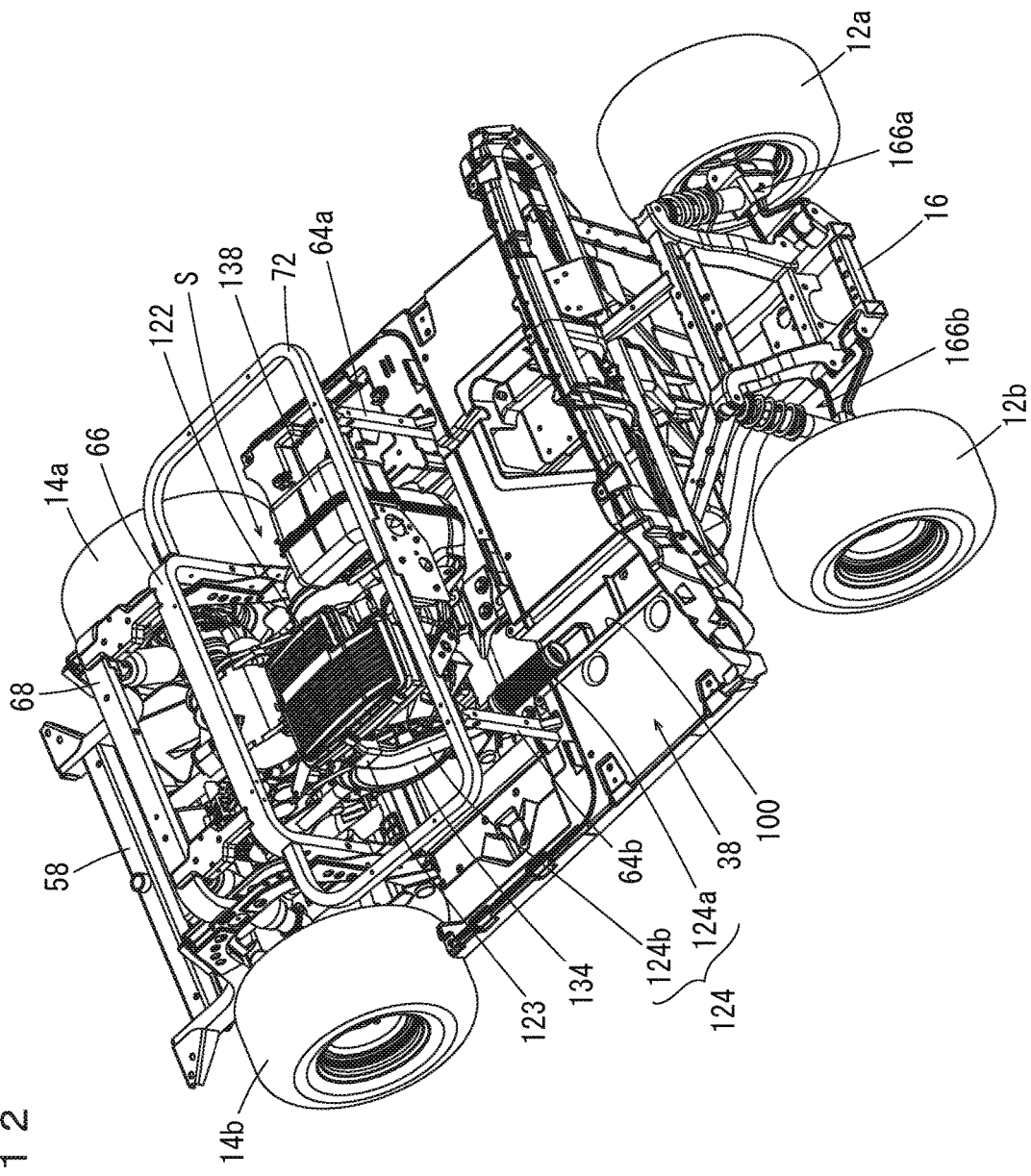
FIG. 12 is a front perspective view showing a primary portion of the golf car.
Figure 13:
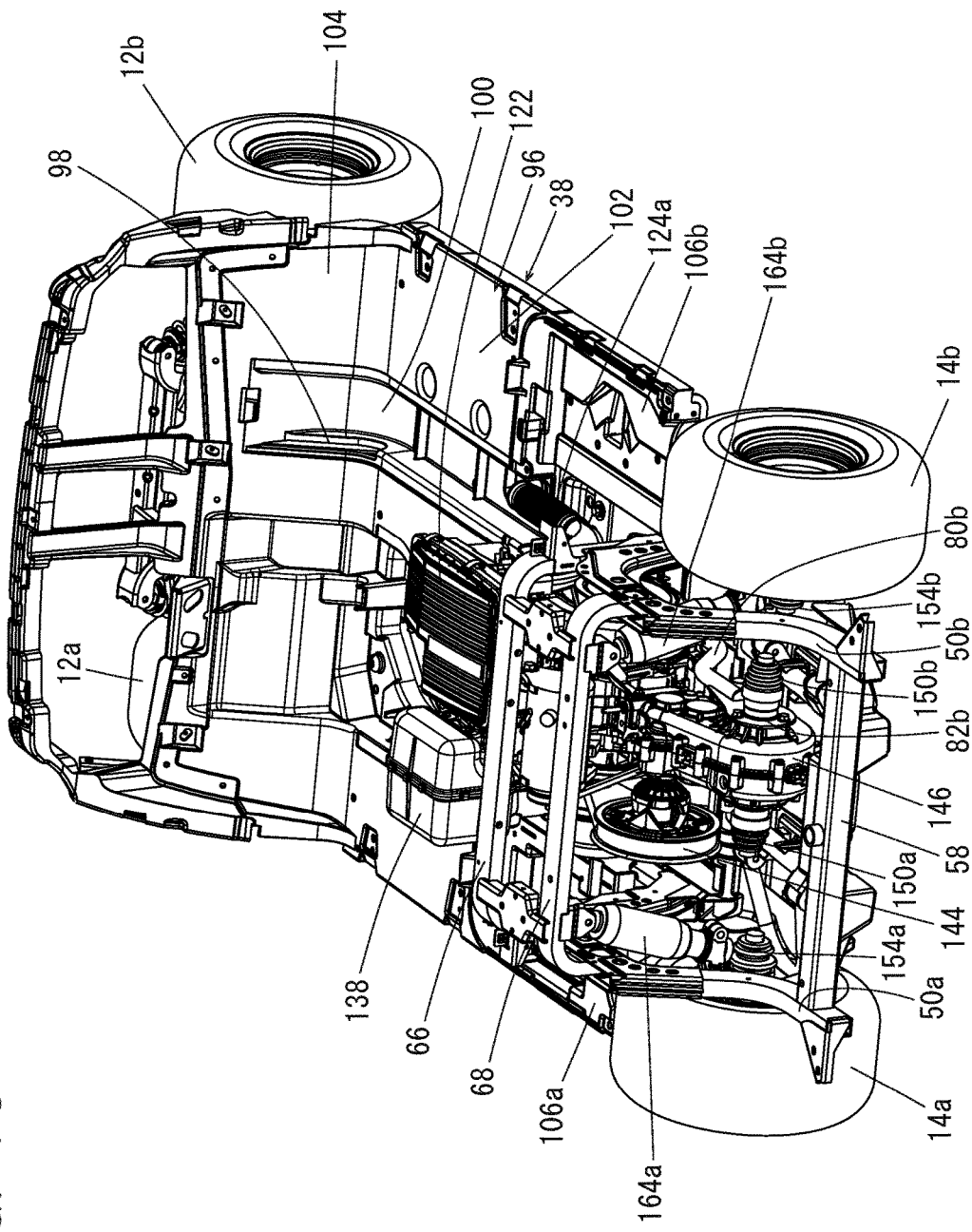
FIG. 13 is a rear perspective view showing a primary portion of the golf car.

Referring to FIG. 12, the pair of front wheels 12a, 12b are suspended by a pair of suspensions 166a, 166b attached to the front region of the frame 16. In the present preferred embodiment, the pair of suspensions 166a, 166b are preferably independent suspension systems.

Figure 14:
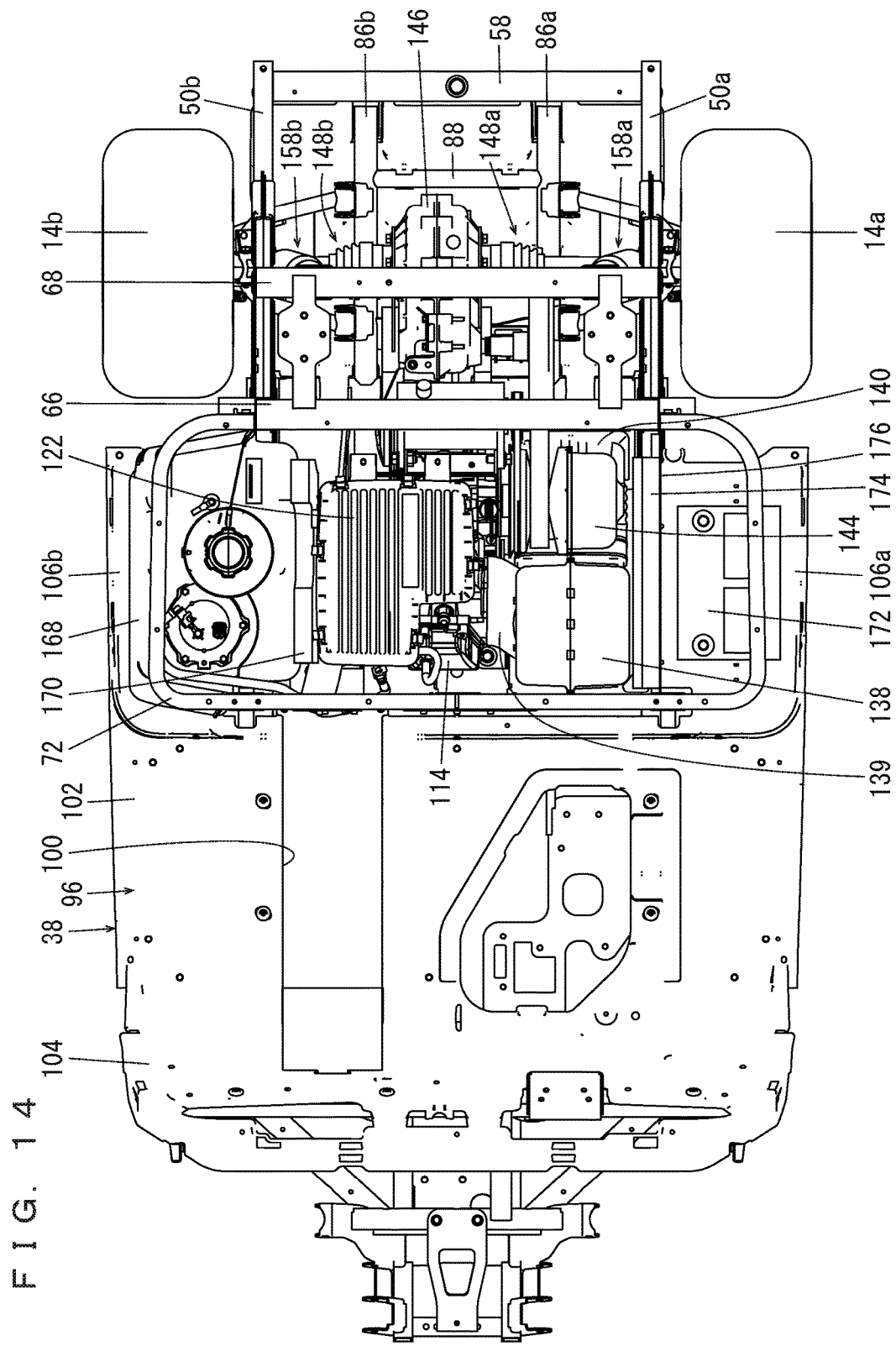
FIG. 14 is a plan view showing a primary portion of the golf car.
Figure 15:
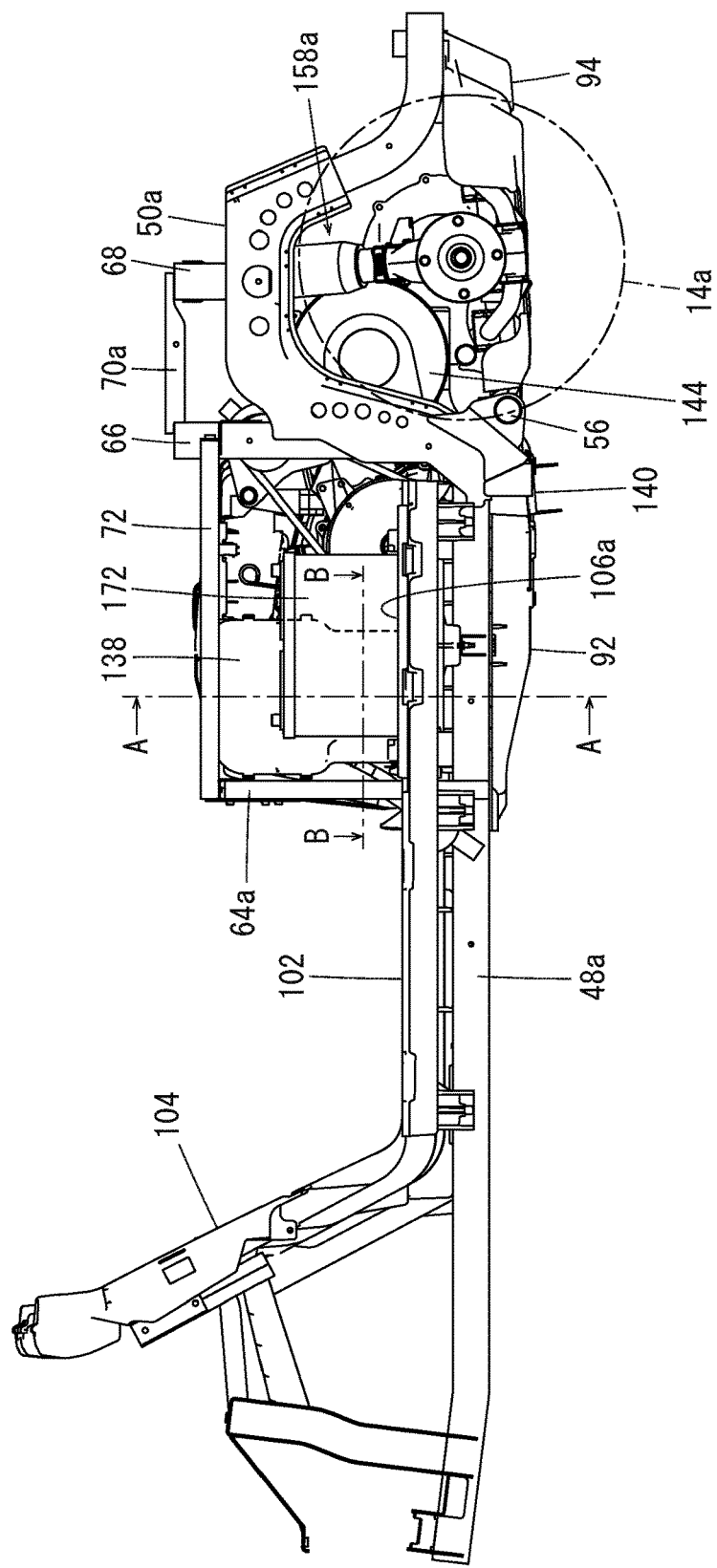
Figure 16:
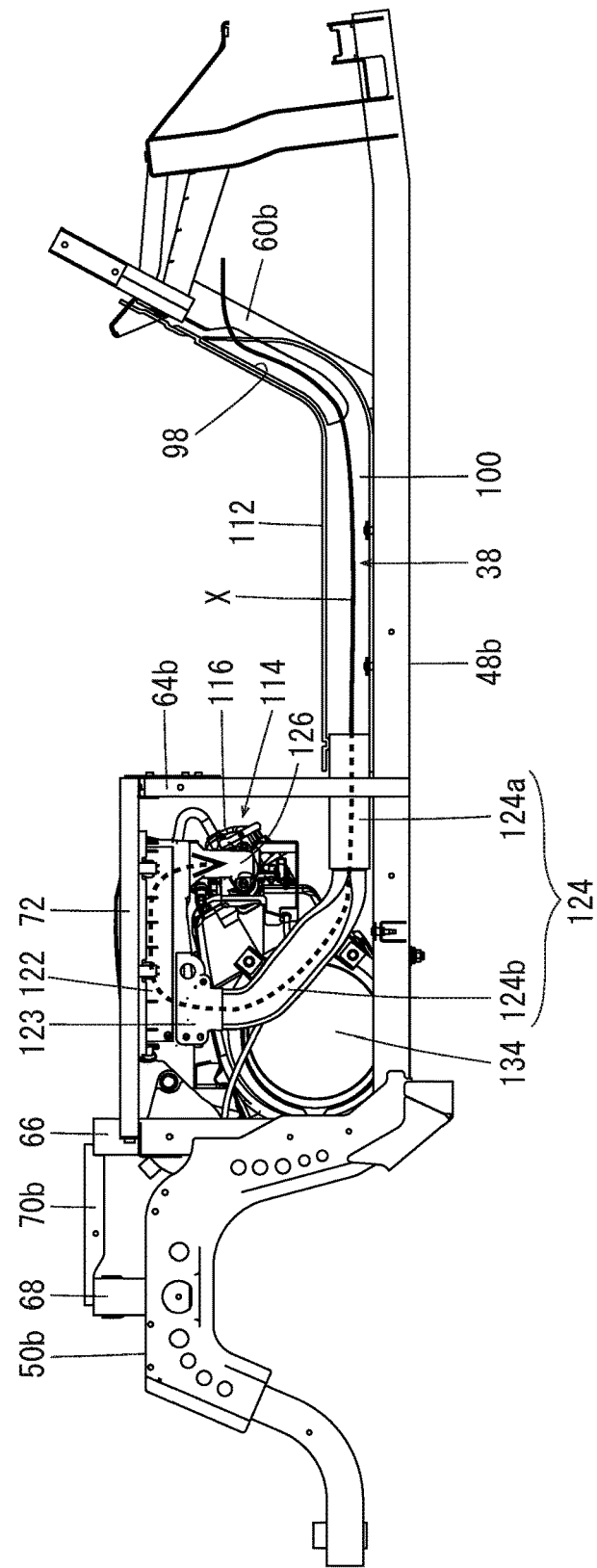
FIG. 16 is a side view (taken from right) showing the frame, a groove, and so on, in a state in which a portion of the floor panel on a right side of the groove is removed.
Figure 17:
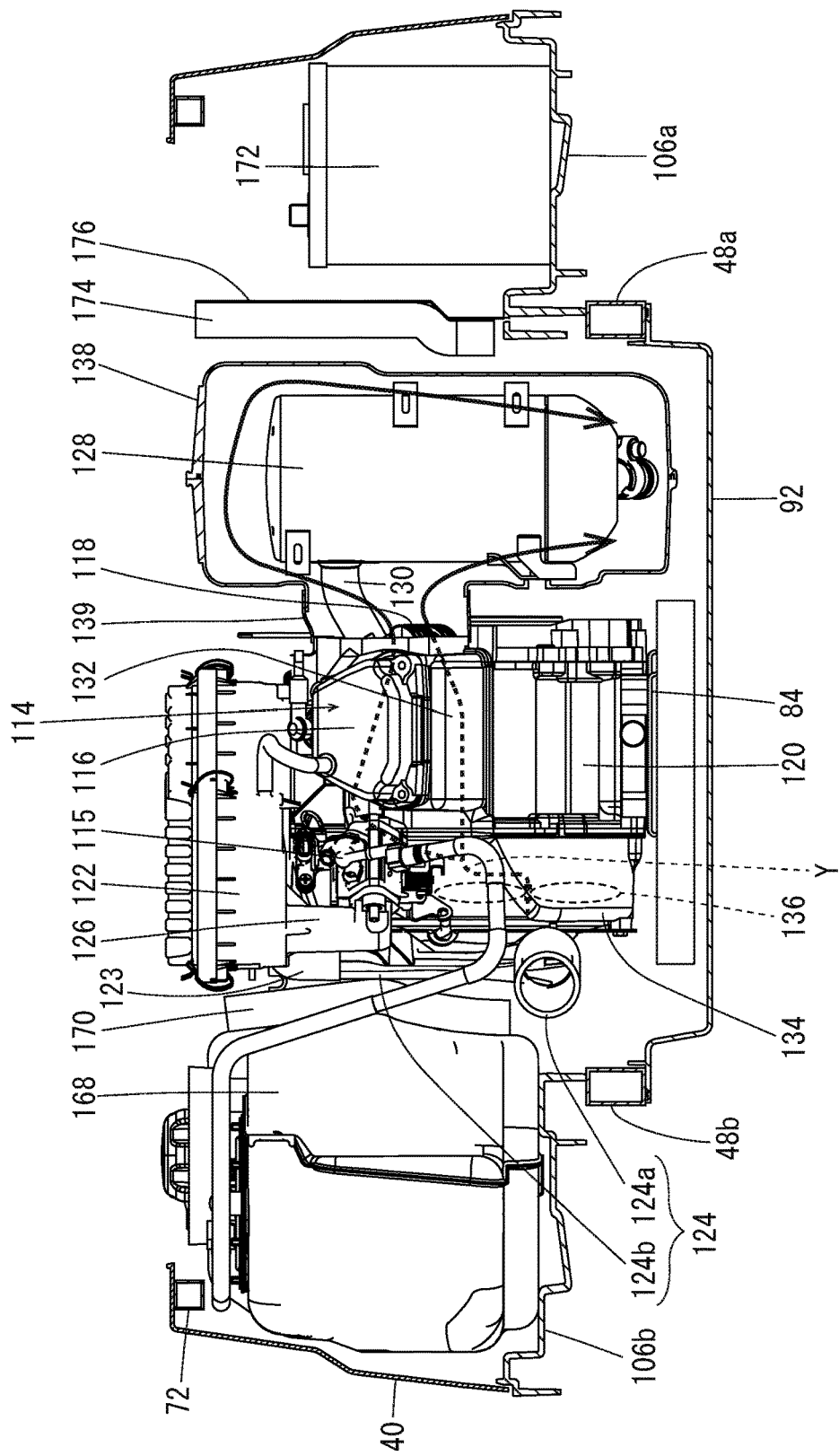
FIG. 17 is a front view with a partial section taken along a line A-A in FIG. 15 to show an engine, a muffler, and their surroundings.
Figure 18:
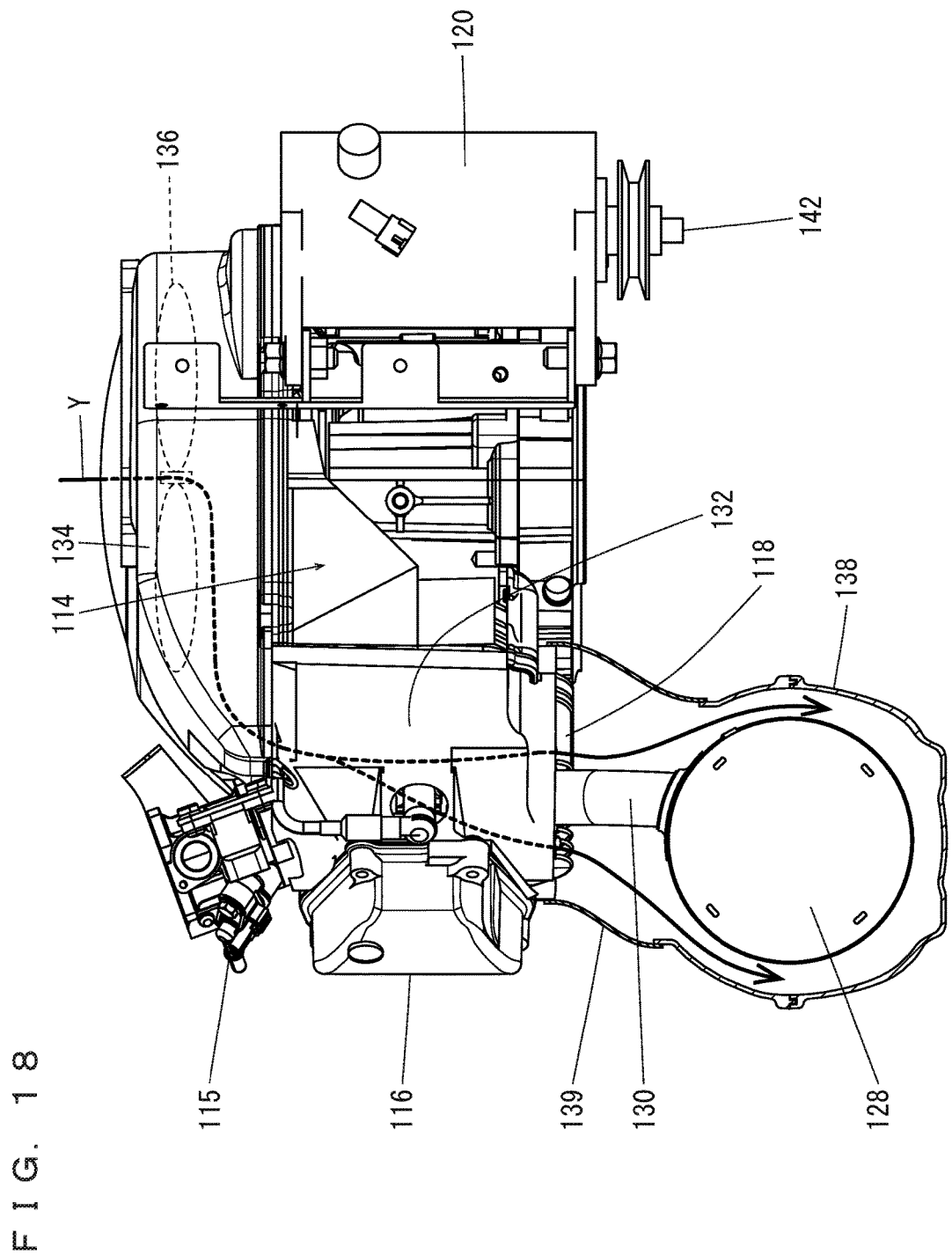
FIG. 18 is a plan view with a partial section taken along a line B-B in FIG. 15 to show the engine, the muffler, and their surroundings.
Figure 19:
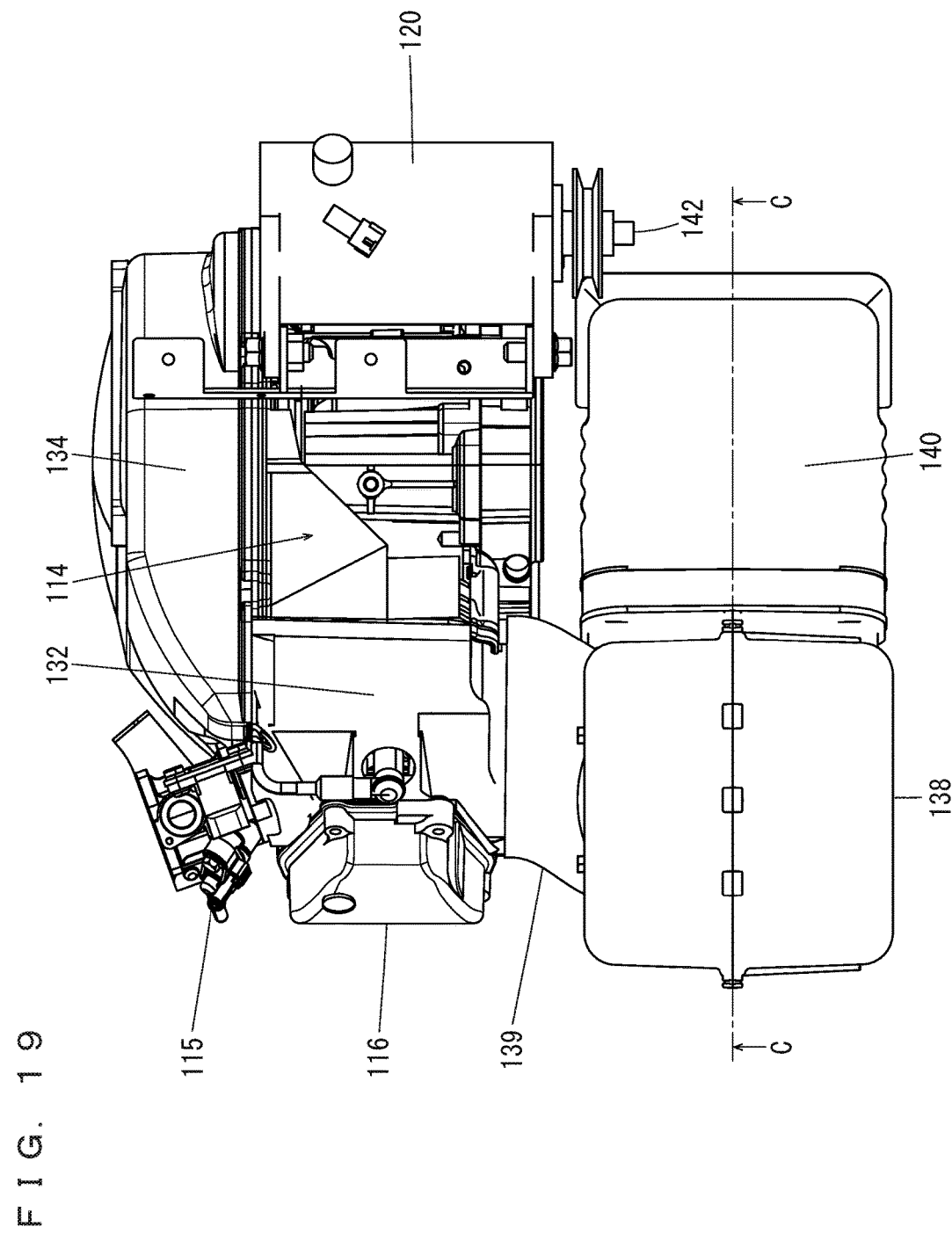
FIG. 19 is a plan view showing the engine, a muffler cover, and their surroundings.

Referring to FIG. 14 and FIG. 17, the fuel tank 168 is located on the right side of the engine 114 and on the third panel 106b of the floor panel 38. Between the engine 114 and the fuel tank 168, a sound absorbing member 170 is provided and attached to a side surface of the fuel tank 168. Also, a battery 172 is located on the left of the muffler cover 138 and on the third panel 106a of the floor panel 38. Between the muffler cover 138 and the battery 172, a two-ply structure made of a sound absorbing member 174 and the heat insulation board 176 is provided. It is possible, with the sound absorbing members 170 and 174, to absorb noise from the engine room S, whereas it is possible, with the heat insulation board 176, to reduce heat conducting from the engine room S to the battery 172.

Figure 22:
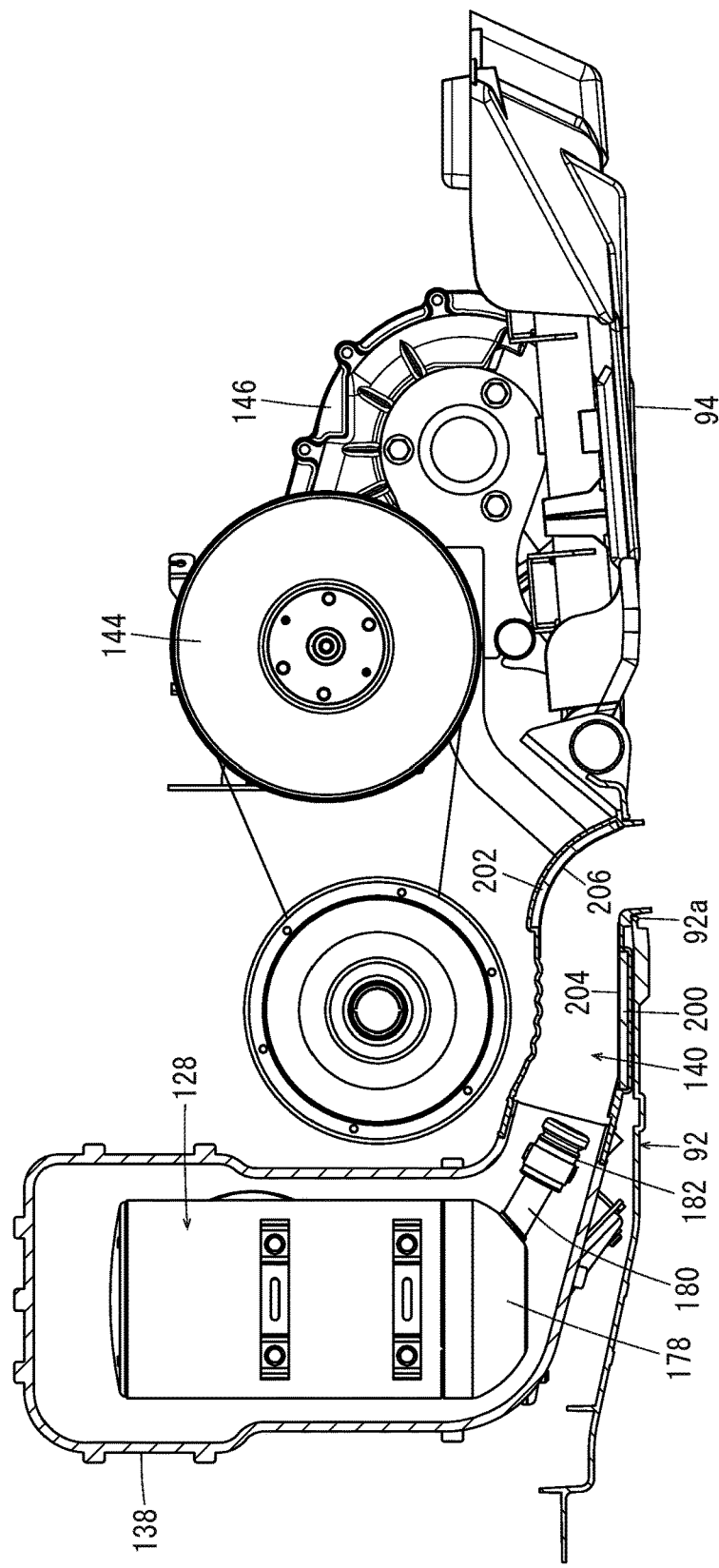
FIG. 22 is a side view with a partial section taken along a line C-C in FIG. 19 to show the muffler, the muffler cover, an exhaust duct, and their surroundings.
Figure 23:
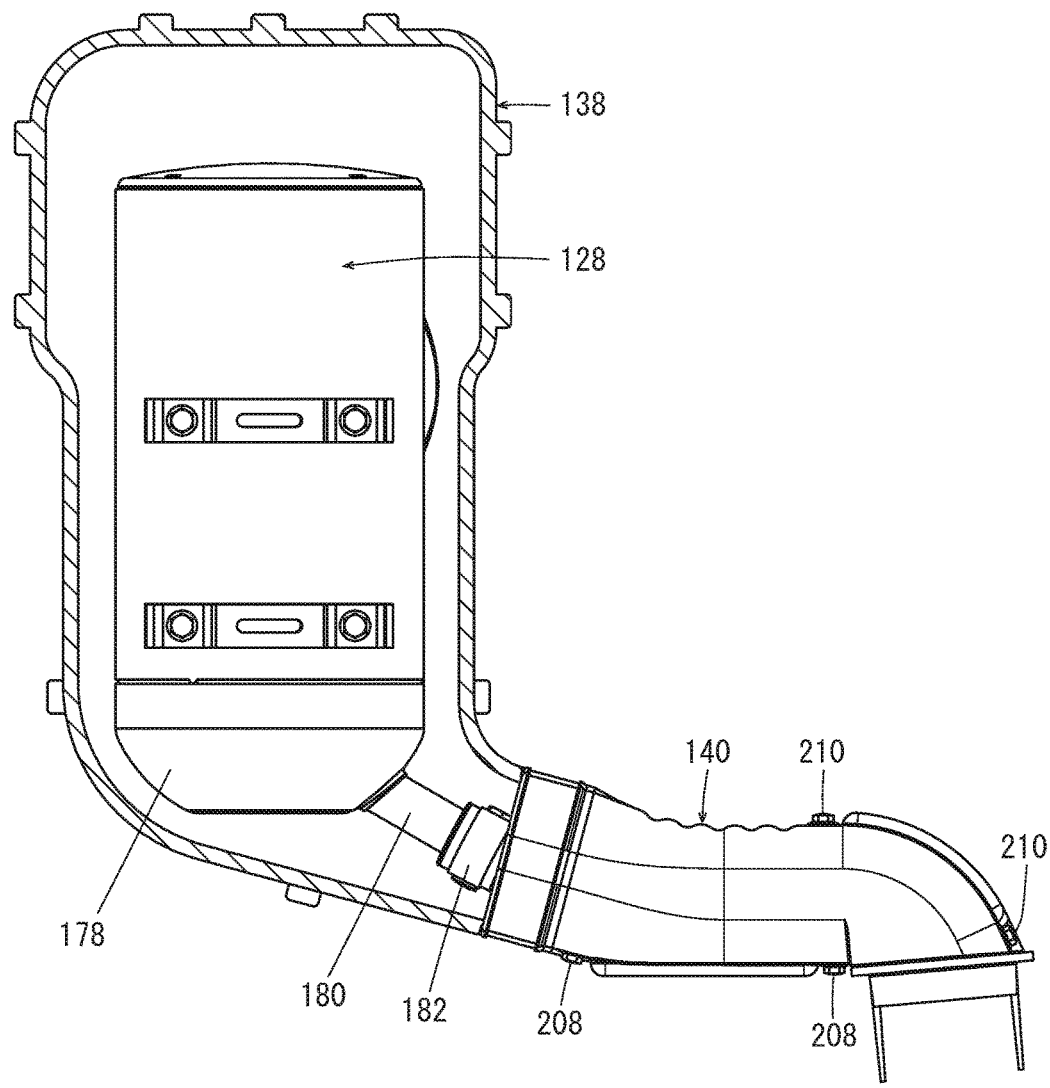
FIG. 23 is a side view with a partial section, to show the muffler, the muffler cover, and the exhaust duct.
Figure 24:
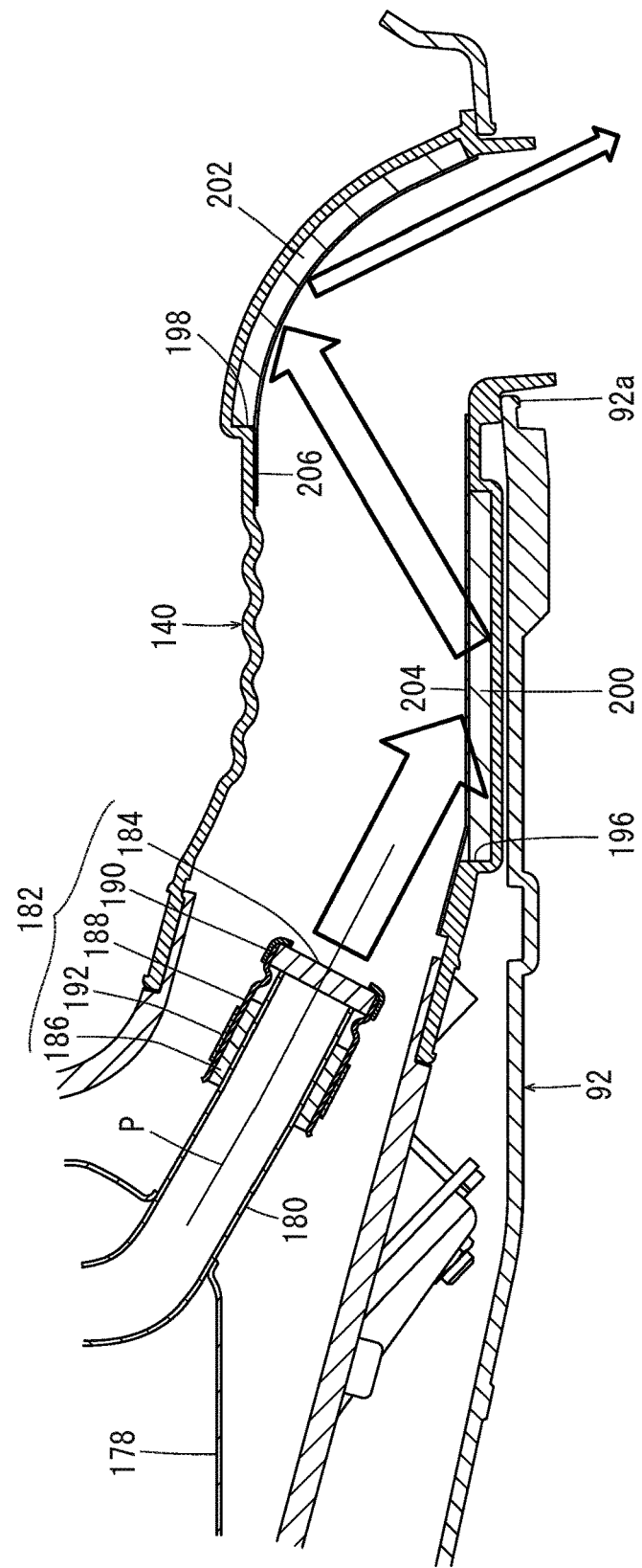
FIG. 24 is an illustrative sectional drawing showing the exhaust duct and its surroundings.

Referring also to FIG. 22 through FIG. 24, the muffler 128, the muffler cover 138, the exhaust duct 140, and their surroundings will be described.

The muffler 128 includes an expansion chamber 178 located at its rear portion, which is stuffed with a sound absorbing material such as glass wool, for example. The expansion chamber 178 reduces exhaust gas noise. The expansion chamber 178 is provided with a discharge pipe 180 extending obliquely rearward and downward. In other words, the muffler 128 includes an outlet (where exhaust gas is discharged), at which the discharge pipe 180 is provided. The discharge pipe 180 includes a rearward end portion at which a joint exhaust 182 is attached.

The joint exhaust 182 includes a silencer 184, a seal 186, a holder 188, a cap 190, and a fastener 192. The silencer 184 is preferably made of a stainless steel mesh member, for example, is provided at the outlet of the muffler 128 via the discharge pipe 180, reduces thrust of the exhaust gas, and alters sound quality of the exhaust gas noise. The seal 186 is preferably a hollow cylinder, and is fitted around a rearward end portion of the discharge pipe 180. The cylindrical holder 188 and the annular cap 190 are preferably integral with each other, and hold the silencer 184 and the seal 186. The fastener 192 is fitted around an outer circumferential surface of the holder 188 to tighten the holder 188 so that the holder 188 presses the silencer 184 and the seal 186 radially inward.

Figure 20:
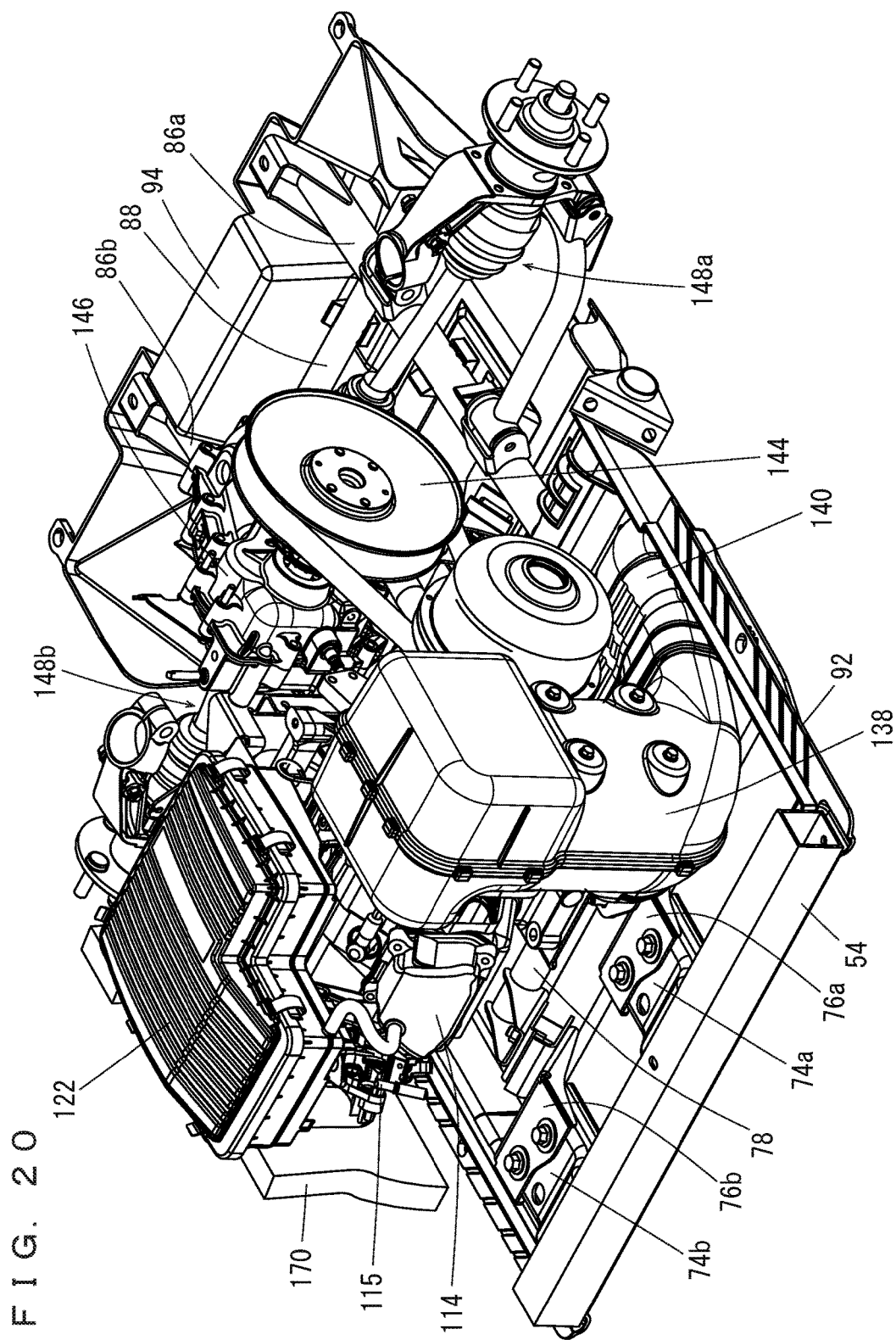
FIG. 20 is a front perspective view showing the engine, the muffler cover, and their surroundings.
Figure 21:
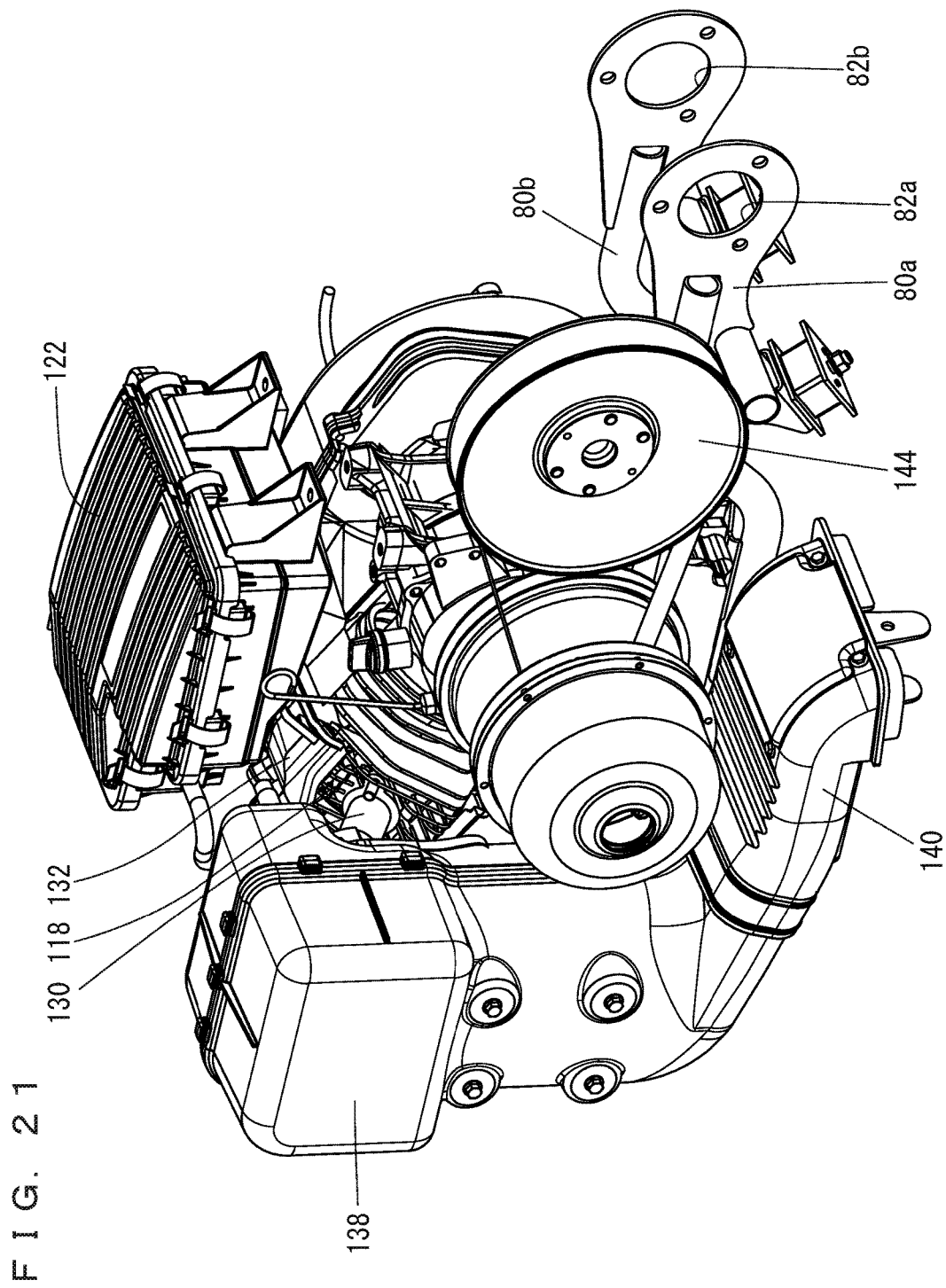
FIG. 21 is a rear perspective view showing the engine, the muffler cover, and their surroundings.

The muffler cover 138 is preferably made of a resin, for example, provided with an insulation member (not illustrated) on its inner surface, and preferably has a substantially rectangular tubular upper portion and a substantially cylindrical lower portion (see FIG. 20 and FIG. 21).

The exhaust duct 140 is preferably made of rubber, for example, is elastic, and has a flattened shape (see FIG. 20 and FIG. 21). In order to discharge the exhaust gas from below the engine room S to the outside, the exhaust duct 140 extends rearward above the undercover 90 (the front cover 92) so that a rearward end portion of the exhaust duct 140 is positioned at the opening 92a of the front cover 92 and is fitted into the opening 92a. The opening 92a is located at a more rearward position than the muffler 128 in a side view. Also, the opening 92a is located at a more rearward position than the muffler cover 138 in a side view. The exhaust duct 140 includes recesses 196, 198 respectively at lower and upper portions in its inner circumferential surface. In the present preferred embodiment, portions of an outer circumferential surface of the exhaust duct 140 corresponding to the recesses 196, 198 are rectangularly shaped and protrude outward (see FIG. 6 and FIG. 21). Sound absorbing members 200, 202 are fitted into the recesses 196, 198 respectively. In this manner, the sound absorbing member 200 is provided on the inner circumferential surface of the exhaust duct 140 along an extended line of a center axis P of the discharge pipe 180 which is provided at the outlet of the muffler 128. The sound absorbing member 202 is located to be hit by exhaust gas after the gas is re-directed by the sound absorbing member 200. Preferably, the sound absorbing members 200, 202 include glass wool, for example. In order to hold the sound absorbing members 200, 202 on the inner circumferential surface of the exhaust duct 140, holders 204, 206 are attached to the inner circumferential surface of the exhaust duct 140. The holders 204, 206 are provided to cover the respective sound absorbing members 200, 202, and are fixed with fasteners 208, 210. Preferably, the holders 204, 206 include perforated plates. The perforated plate refers to a plate-shaped member having a large number of through-holes. In the present preferred embodiment, the holders 204, 206 are made of punched metal, for example. As shown in FIG. 24, noise of the exhaust gas emitted from the discharge pipe 180 of the muffler 128 into the exhaust duct 140 is reflected and absorbed by the sound absorbing members 200, 202 as indicated by white arrows. It should be noted here that in FIG. 24, the thicknesses of the white arrows indicate sound pressures, to show that exhaust gas noise is gradually attenuated.

According to the golf car 10 described above, the exhaust duct 140 which is connected to the exit end portion of the muffler cover 138 extends rearward above the undercover 90 that is provided at a lower position than the engine 114, whereas the exhaust duct 140 has its rearward end portion positioned at the opening 92a which is located at a more rearward position than the muffler 128 in a side view. Exhaust gas from the muffler 128 passes through the exhaust duct 140 and the opening 92a of the undercover 90 (front cover 92), and is discharged from below the engine room S to the outside. Since the exhaust duct 140 extends rearward so that the rearward end portion of the exhaust duct 140 is located at a more rearward position than the muffler 128, noise from the muffler 128 is attenuated inside the exhaust duct 140. Also, since the exhaust duct 140 is connected to the muffler cover 138, the cooling wind from the muffler cover 138 passes through the exhaust duct 140 and is discharged from the opening 92a, and noise propagating through the muffler cover 138, such as vibration noise of the engine 114, is attenuated inside the exhaust duct 140. Therefore, it is possible to reduce noise leakage to the outside of the vehicle.

Since the exhaust duct 140 is elastic and is able to absorb vertical movements of the muffler cover 138, it is possible to position the rearward end portion of the exhaust duct 140 in a stable manner at the opening 92a of the undercover 90.

Since the exhaust duct 140 is fitted into the opening 92a, it is easy to position and attach the exhaust duct 140.

The silencer 184 makes it possible to further attenuate the noise from the muffler 128, and thus further reduce noise leakage out of the vehicle.

The exhaust gas noise emitted from the muffler 128 is attenuated by the sound absorbing members 200, 202 provided on the inner circumferential surface of the exhaust duct 140. This structure further reduces noise leakage out of the vehicle.

Since the sound absorbing members 200, 202 may be provided only at necessary locations on the inner circumferential surface of the exhaust duct 140, it is possible to reduce costs.

The holders 204, 206 make it possible to reliably hold the sound absorbing members 200, 202 on the inner circumferential surface of the exhaust duct 140.

The structure in which the holders 204, 206 include perforated plates makes it possible to provide the sound absorbing members 200, 202 reliably on the inner circumferential surface of the exhaust duct 140 while maintaining the sound absorbing capabilities of the sound absorbing members 200, 202.

It should be noted here that sound absorbing members may be attached to the seat 18, the body panel 39, the rear floor cover 42, the undercover 90, and the left and right inner cowls 95.

Figure 25:
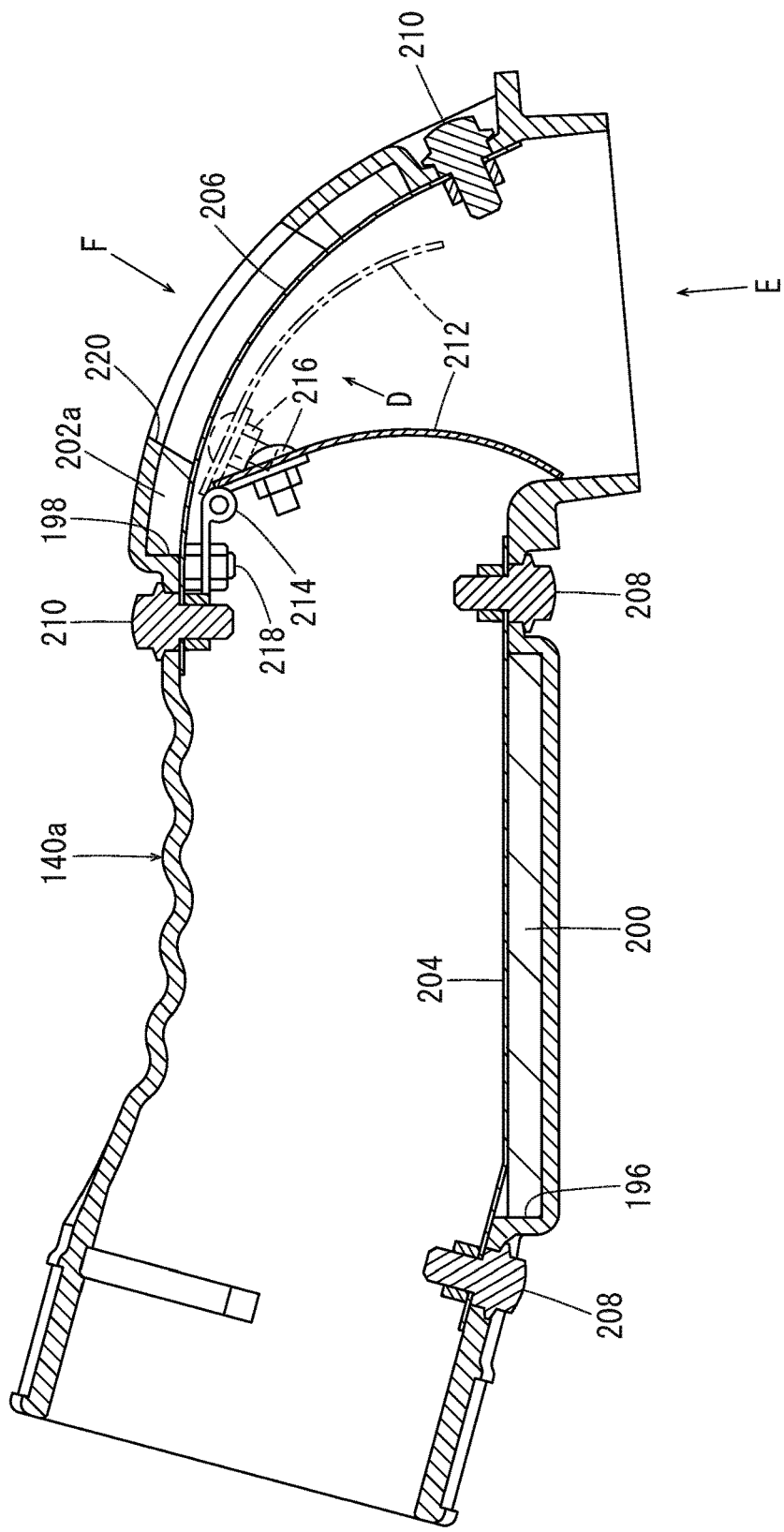
FIG. 25 is an illustrative sectional drawing showing a primary portion in a preferred embodiment of the present invention including an open/close member and a cooling hole.

Also, the exhaust duct 140 may be replaced with an exhaust duct 140a as shown in FIG. 25, wherein an open/close member 212 is provided inside the exhaust duct 140a. The exhaust duct 140a is identical to the exhaust duct 140 except that it includes a cooling hole 220 (which will be described below). The open/close member 212 is able to be opened when the golf car 10 is moving and closed when the golf car 10 stops. In the present preferred embodiment, the open/close member 212 has a structure such that it is opened by exhaust gas which passes through the exhaust duct 140a, and it is closed by gravity (own weight) of the open/close member 212. The amount or degree of opening (an extent of opening) of the open/close member 212 is set in accordance with exhaust gas pressure received by the open/close member 212. FIG. 25 shows a closed state of the open/close member 212 indicated in a solid line and a fully opened state of the open/close member 212 indicated in an alternate long and short dash line. As the exhaust gas pressure (amount of exhaust gas) increases, the degree of opening of the open/close member 212 increases.

Figure 26:
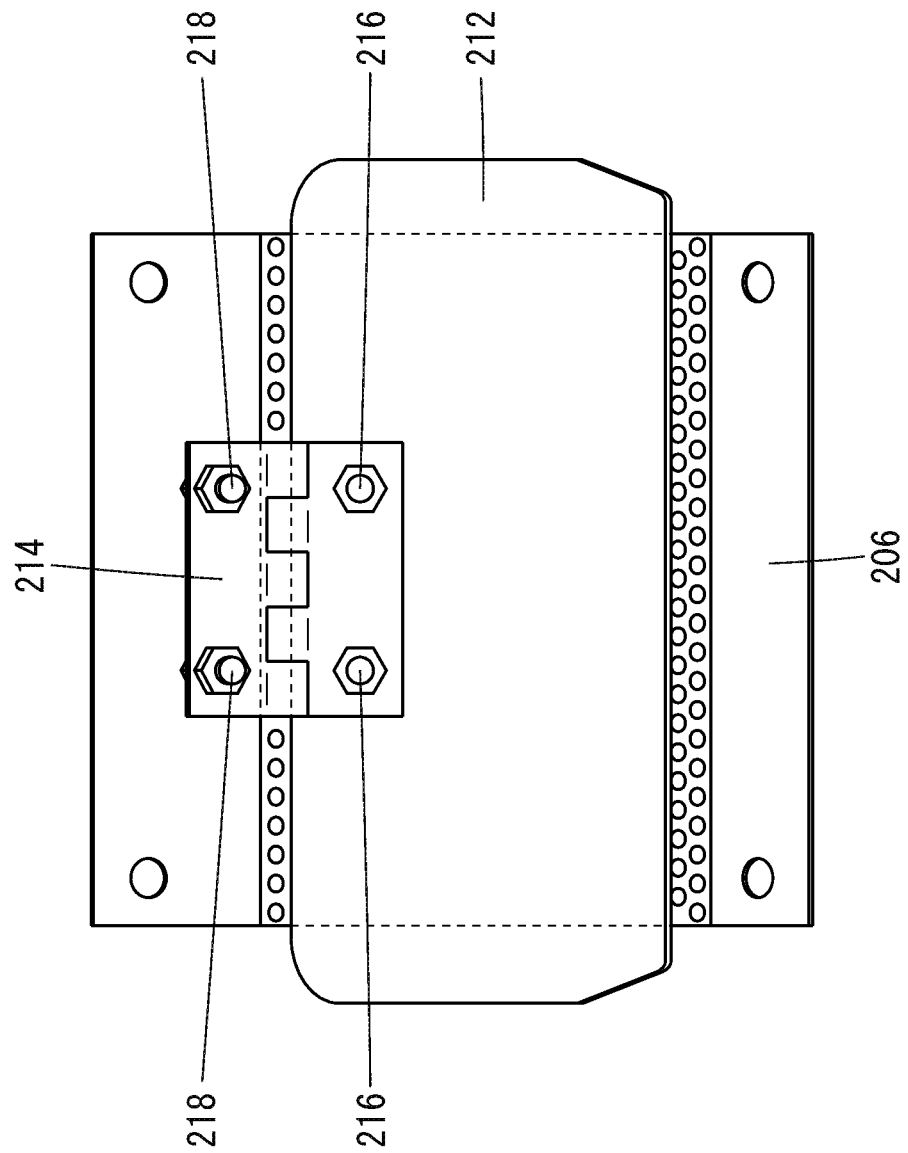
FIG. 26 shows the open/close member, a holder, and so on viewed from the direction of Arrow D (see FIG. 25), in a state in which the open/close member is opened.
Figure 27:
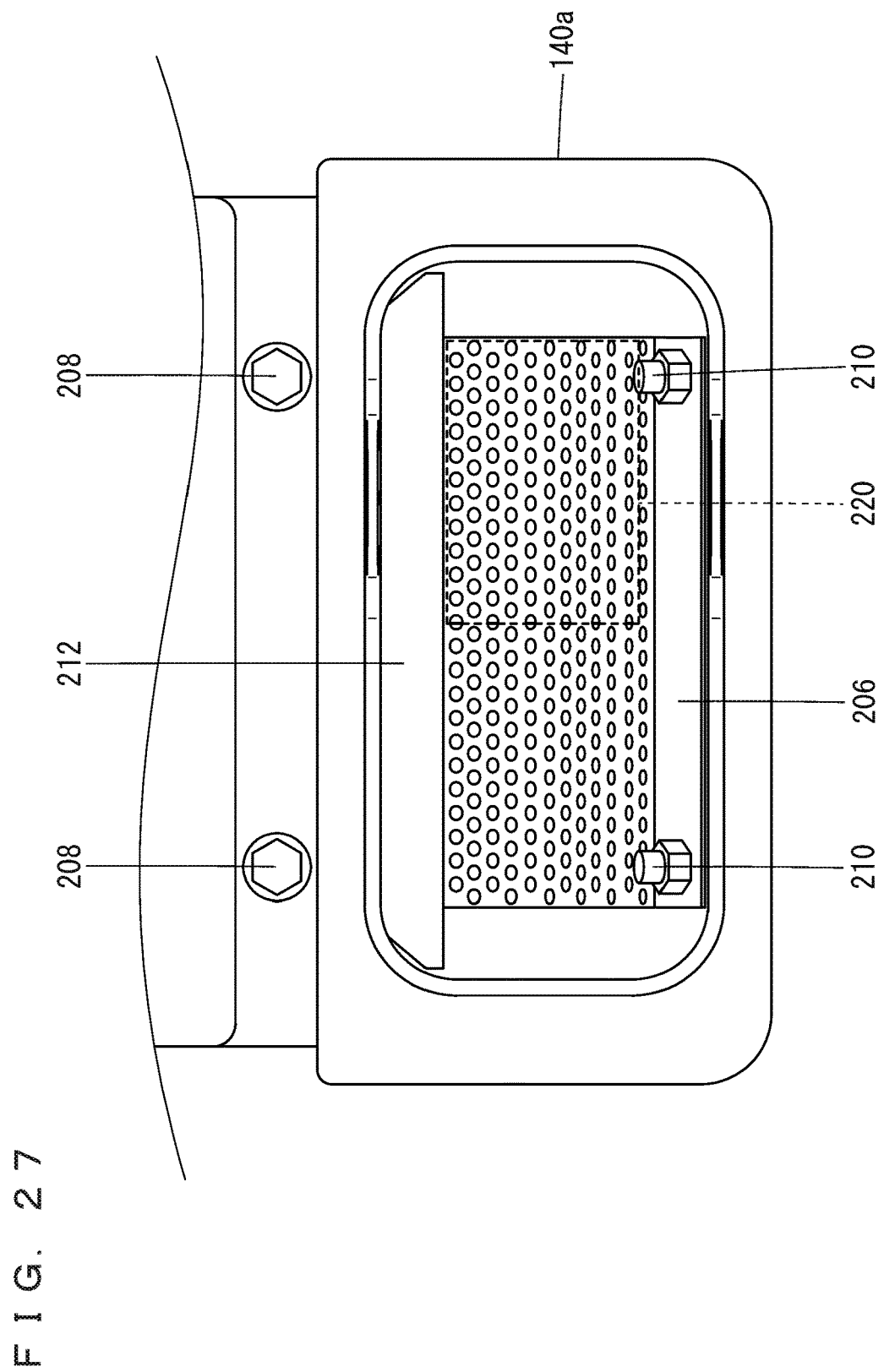
FIG. 27 shows the exhaust duct, the open/close member, the holder, and so on viewed from the direction of Arrow E (see FIG. 25), in a state in which the open/close member is closed.

Referring to FIG. 25 through FIG. 27, the open/close member 212 is defined by, for example, a stainless steel exhaust gas flap including a slightly curved plate. The open/close member 212 is joined at a widthwise intermediate region of its end portion (upper end portion) to a widthwise intermediate region of an end portion (upper end portion) of the holder 206 via a hinge 214 made of stainless steel, for example. The open/close member 212 and the hinge 214 are connected to each other with a fastener 216, whereas the holder 206 and the hinge 214 are connected to each other with a fastener 218. The open/close member 212 is wider than the holder 206. The open/close member 212 is openable/closable (pivotable) around the hinge 214. The open/close member 212 is located adjacent to the opening 92a where the rearward end portion of the exhaust duct 140a is located.

Figure 28:
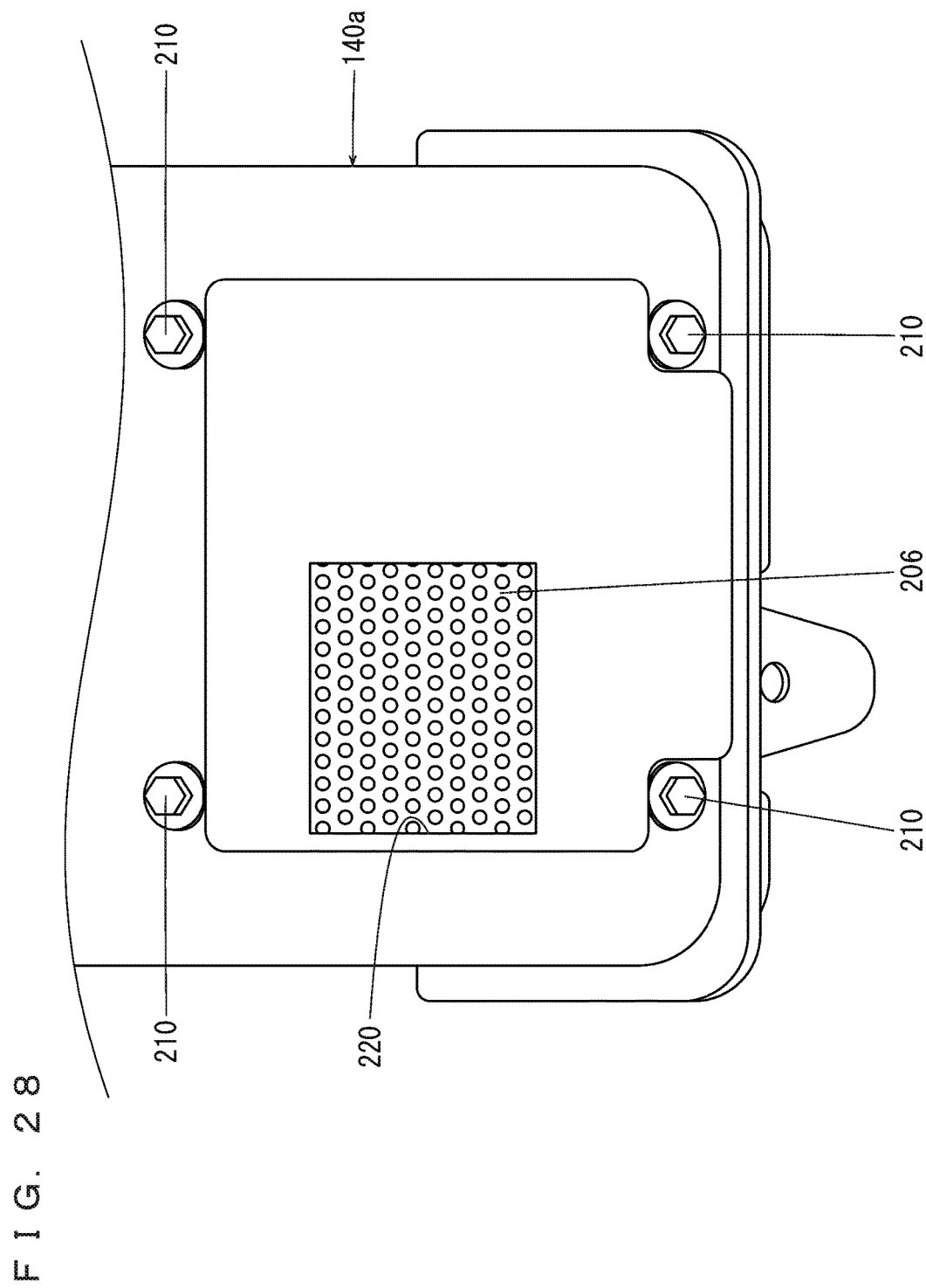
FIG. 28 shows the exhaust duct, the cooling hole, the holder, and so on viewed from the direction of Arrow F (see FIG. 25).

Referring also to FIG. 28, in the exhaust duct 140a, a cooling hole 220 penetrates an inner circumferential surface and an outer circumferential surface (an upper surface corresponding to the recess 198 in the present preferred embodiment) of the exhaust duct 140a downstream of, but adjacent to, the open/close member 212 in its closed state. The cooling hole 220 is located above the opening 92a where the rearward end portion of the exhaust duct 140a is located. A sound absorbing member 202a, in which portions corresponding to the cooling hole 220 are removed, is fitted into the recess 198 of the exhaust duct 140a. Therefore, the holder 206 is exposed to the outside via the cooling hole 220.

Figures 29A, 29B:
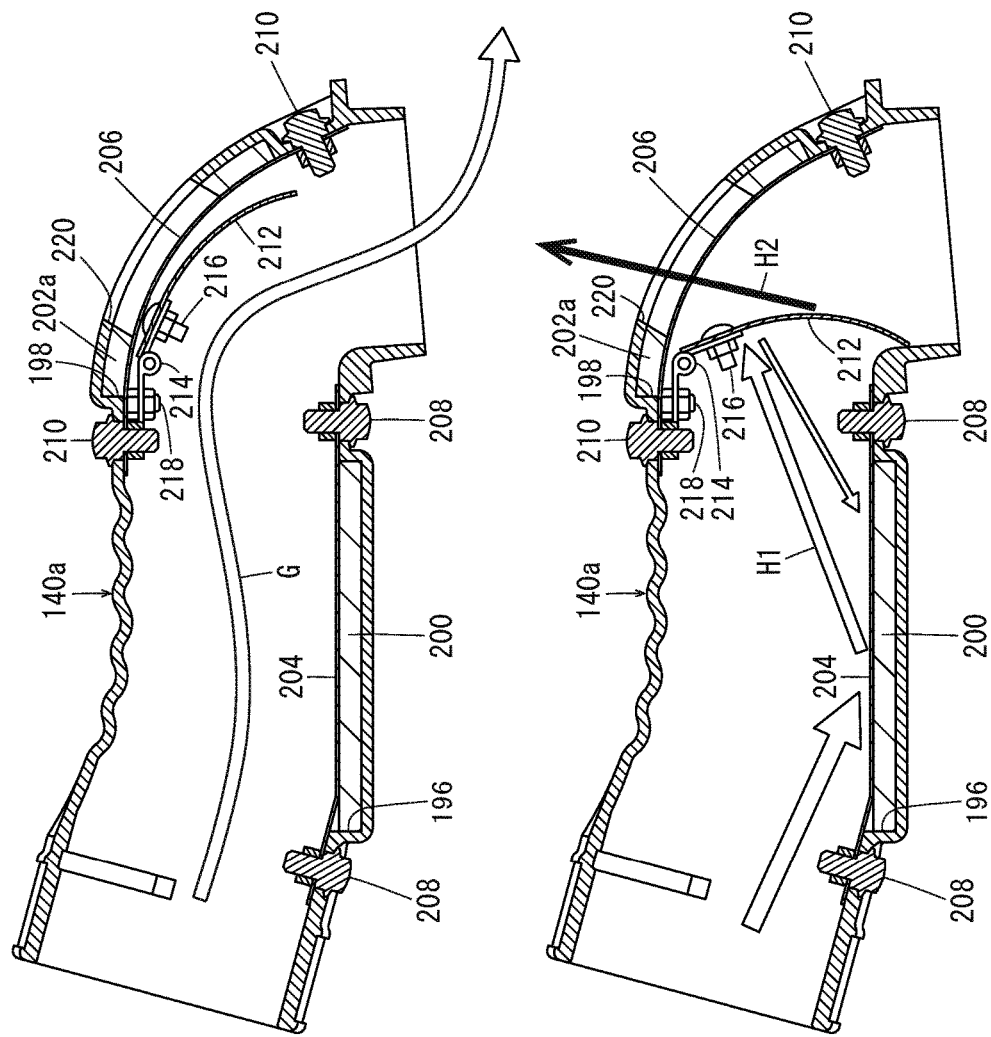
FIG. 29A is an illustrative drawing showing a flow of exhaust gas in a state in which the open/close member is opened.
FIG. 29B is an illustrative drawing showing sound pressure changes and a direction in which exhaust heat is directed, in the state in which the open/close member is closed.

According to the present preferred embodiment, when the golf car 10 is moving, the open/close member 212 opens, thus enabling exhaust gas from the muffler 128 to discharge smoothly to the outside from below the engine room S via the exhaust duct 140a and the opening 92a of the undercover 90, as indicated in FIG. 29A with a white arrow G. On the other hand, when the golf car 10 is stopped, the open/close member 212 closes, such that it is possible to further attenuate noises such as noise from the muffler 128 and vibration noise of the engine 114 which propagates through the muffler cover 138, in the exhaust duct 140a, as indicated in FIG. 29B with a white arrow H1, and therefore further reduces noise leakage to the outside of the vehicle. It should be noted here that the thicknesses of the white arrows H1 indicate sound pressures.

Since the open/close member 212 is able to be opened by the exhaust gas which passes through the exhaust duct 140a, there is no need to provide any separate elements to open the open/close member 212, yet it is possible to open the open/close member 212.

When the engine 114 is running at a slow speed (e.g., not greater than about 2500 rpm), exhaust gas pressure (the amount of exhaust gas) is small and the open/close member 212 is half open, so it is possible to achieve both discharging of the exhaust gas and reducing noise leakage to the outside of the vehicle. This structure is particularly effective when the golf car 10 is traveling at a constant speed.

When the golf car 10 is stopped and the open/close member 212 is closed, heat at the open/close member 212 is released through the cooling hole 220 to the outside (above, in the present preferred embodiment) the exhaust duct 140*a* as indicated in FIG. 29B with an arrow H2, such that it is possible to cool the open/close member 212 and therefore reduce deterioration of the open/close member 212 due to heat.

It should be noted here that although the open/close member 212 is able to be closed by its own weight in the preferred embodiment shown in FIG. 25, the present invention is not limited to this. The open/close member 212 may be closed by an elastic member such as a spring, for example.

In the preferred embodiments described above, description was made of a golf car. However, the present invention is not limited to this. The preferred embodiments of the present invention are applicable to any other vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
an engine including a cylinder body;
a muffler that receives exhaust gas from the engine;
a shroud that covers the cylinder body;
a muffler cover that covers the muffler and communicates with the shroud;
an undercover provided at a lower position than the engine and including an opening;
an exhaust duct connected to an exit end portion of the muffler cover; and
an engine room including an underside defined by the undercover, and which houses the engine, the muffler, the shroud, the muffler cover, and the exhaust duct; wherein
the opening is located at a more rearward position than the muffler in a side view of the vehicle; and
the exhaust duct is routed above the undercover and a rearward end portion of the exhaust duct is positioned at the opening in order to discharge the exhaust gas from below the engine room to the outside.

2. The vehicle according to claim 1, wherein the exhaust duct is elastic.

3. The vehicle according to claim 1, wherein the exhaust duct is connected to the opening.

4. The vehicle according to claim 1, further comprising a silencer provided at an outlet of the muffler.

5. The vehicle according to claim 1, further comprising a sound absorbing member provided on an inner circumferential surface of the exhaust duct.

6. The vehicle according to claim 5, further comprising a discharge pipe provided at an outlet of the muffler; wherein
the sound absorbing member is located in the exhaust duct along an extended line of a center axis of the discharge pipe.

7. The vehicle according to claim 5, further comprising a holder that holds the sound absorbing member on the inner circumferential surface of the exhaust duct; wherein
the holder includes a perforated plate.

8. The vehicle according to claim 1, further comprising an open/close member provided inside the exhaust duct; wherein
the open/close member is able to be opened when the vehicle is traveling and closed when the vehicle is stopped.

9. The vehicle according to claim 8, wherein the open/close member is able to be opened by the exhaust gas passing through the exhaust duct.

10. The vehicle according to claim 9, wherein the open/close member is opened to an amount corresponding to an exhaust gas pressure received by the open/close member.

11. The vehicle according to claim 8, further comprising a cooling hole provided in the exhaust duct; wherein
the cooling hole penetrates an inner circumferential surface and an outer circumferential surface of the exhaust duct downstream of, but adjacent to, the open/close member when the open/close member is closed.

* * * * *